United States Patent
Ji et al.

(10) Patent No.: US 8,218,977 B2
(45) Date of Patent: Jul. 10, 2012

(54) INTEGRATED EQUALIZER AND MICHELSON INTERFEROMETER STRUCTURE FOR INTER-SYMBOL INTERFERENCE-SUPPRESSED COLORLESS DPSK DEMODULATION

(75) Inventors: Philip Nan Ji, Princeton, NJ (US); Lei Xu, Princeton Junction, NJ (US); Ting Wang, West Windsor, NJ (US); Shuji Murakami, Herndon, VA (US); Tsutomu Tajima, Tokyo (JP); Yutaka Yano, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 137 days.

(21) Appl. No.: 12/731,869

(22) Filed: Mar. 25, 2010

(65) Prior Publication Data

US 2010/0232803 A1 Sep. 16, 2010

Related U.S. Application Data

(62) Division of application No. 11/692,432, filed on Mar. 28, 2007, now abandoned.

(51) Int. Cl.
    *H04B 10/06* (2006.01)
(52) U.S. Cl. .......... 398/202; 398/207; 398/211; 398/212
(58) Field of Classification Search .................. 398/202, 398/207, 211, 212
    See application file for complete search history.

(56) References Cited

U.S. PATENT DOCUMENTS 6,867,868 B1 *  3/2005  Barbarossa ............... 356/519
7,606,504 B2 * 10/2009  Onaka et al. ............... 398/214

* cited by examiner

*Primary Examiner* — Danny Leung
(74) *Attorney, Agent, or Firm* — Joseph Kolodka

(57) ABSTRACT

An optical device includes an interferometer for a received optical differential phase shift keying DPSK signal, and an equalizer integrated with the interferometer in a manner for reducing from optical filtering effects an interference by signal bits of the DPSK signal with signal bits of a contiguous DPSK signal. The interferometer is a Michelson delay interferometer type, but can also be a Mach-Zehnder delay interferometer type on fiber, waveguide or other optical structure. The equalizer is a Fabry-Perot type equalizer, but can be a ring resonator type or a fiber based equalizer.

6 Claims, 23 Drawing Sheets

FIG. 2A *Prior Art*
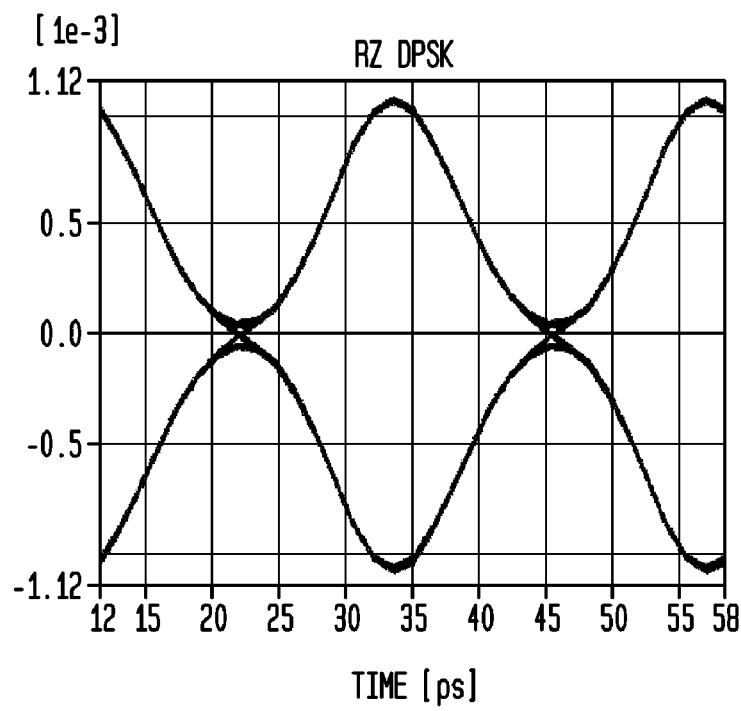
FIG. 2B *Prior Art*
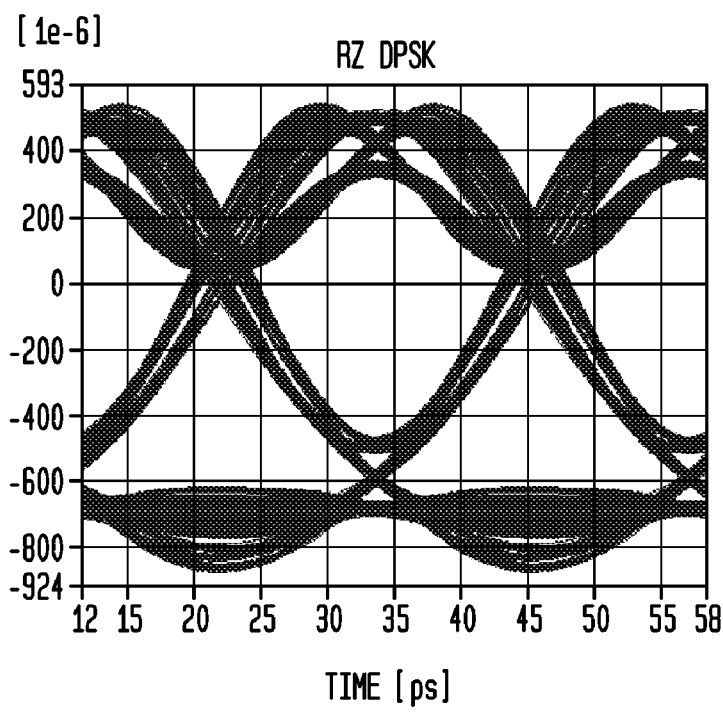

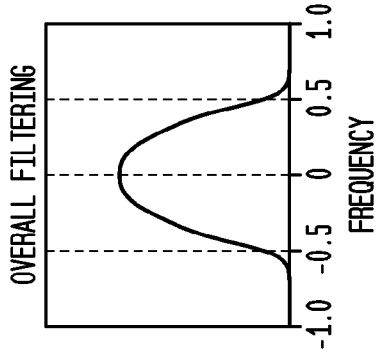
FIG. 3A Prior Art — AWG
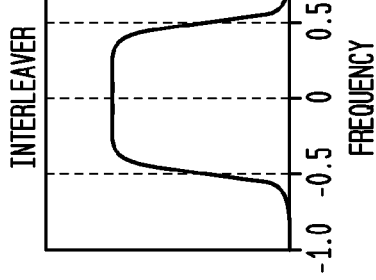
FIG. 3B Prior Art — INTERLEAVER
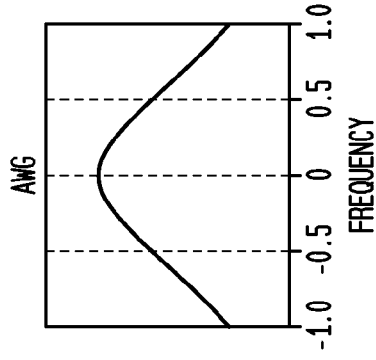
FIG. 3C Prior Art — OVERALL FILTERING
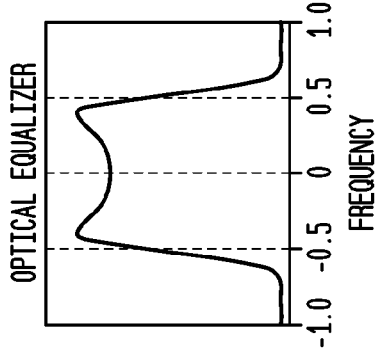
FIG. 3D Prior Art — OPTICAL EQUALIZER
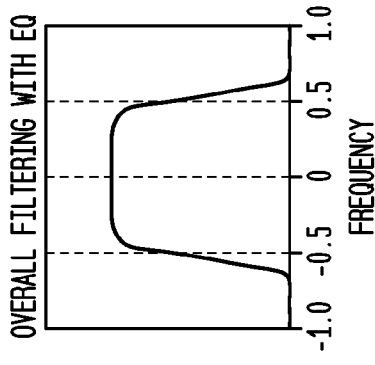
FIG. 3E Prior Art — OVERALL FILTERING WITH EQ

FIG. 4A *Prior Art*
CONSTRUCTIVE PORT
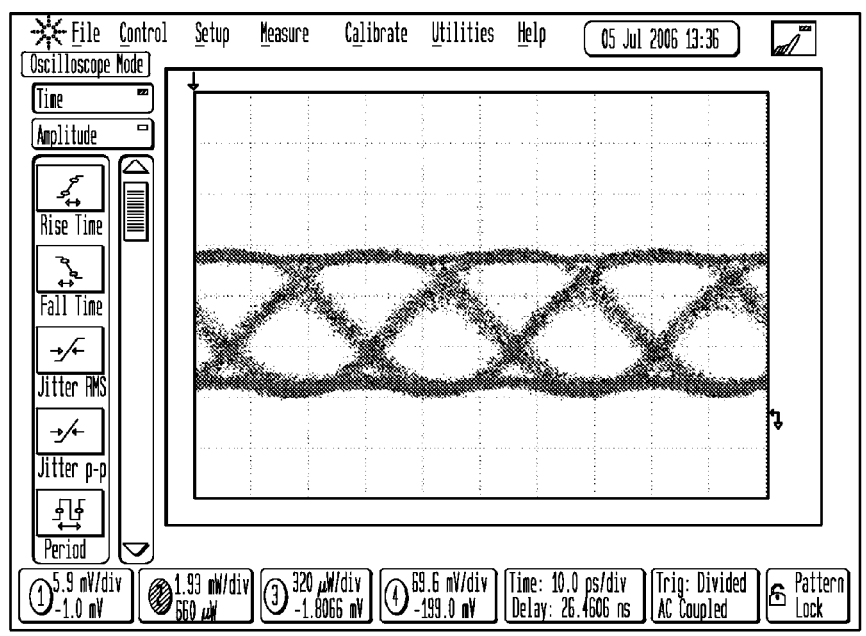
FIG. 4B *Prior Art*
DESTRUCTIVE PORT
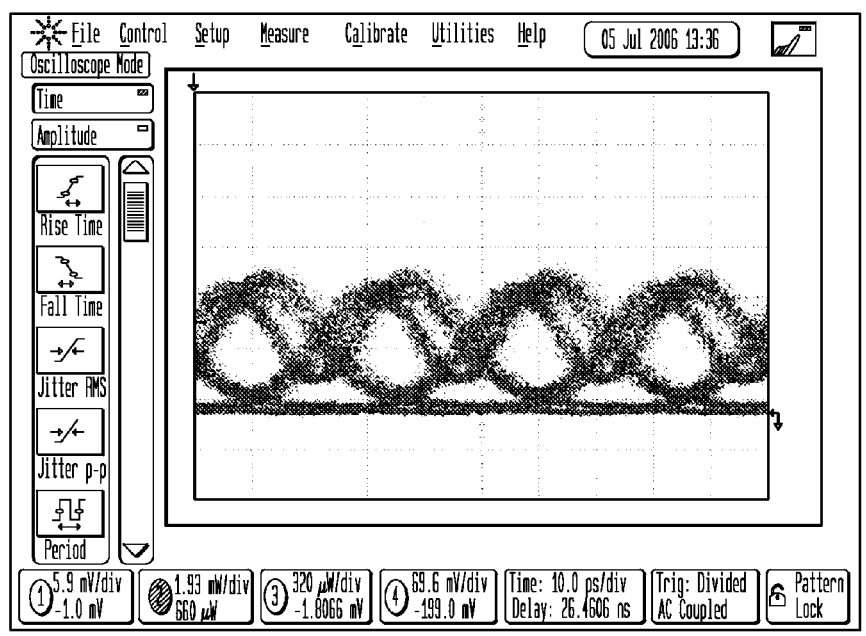

CONSTRUCTIVE PORT

DESTRUCTIVE PORT

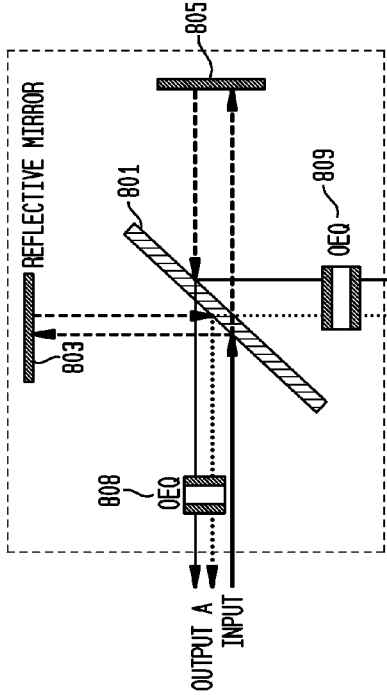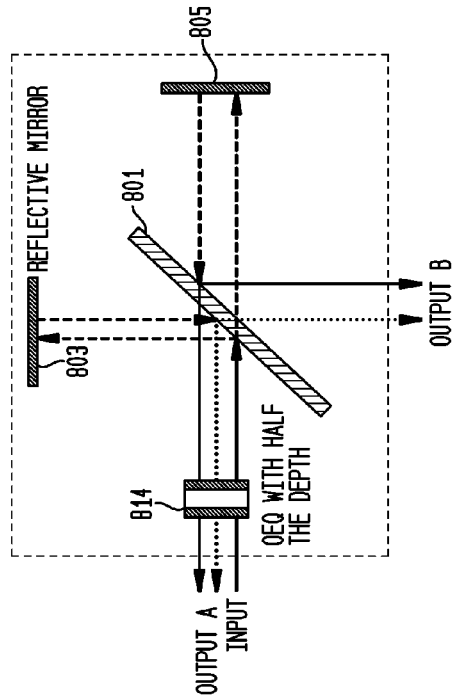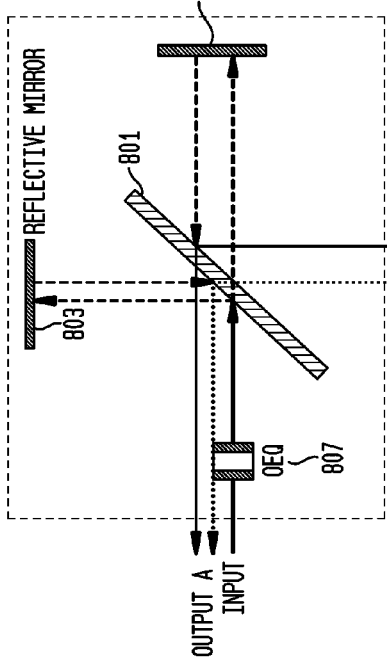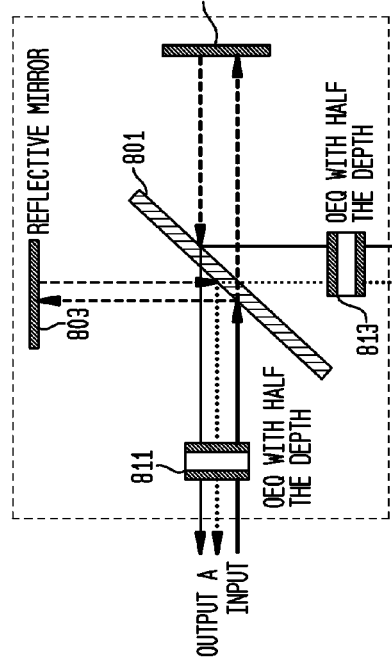

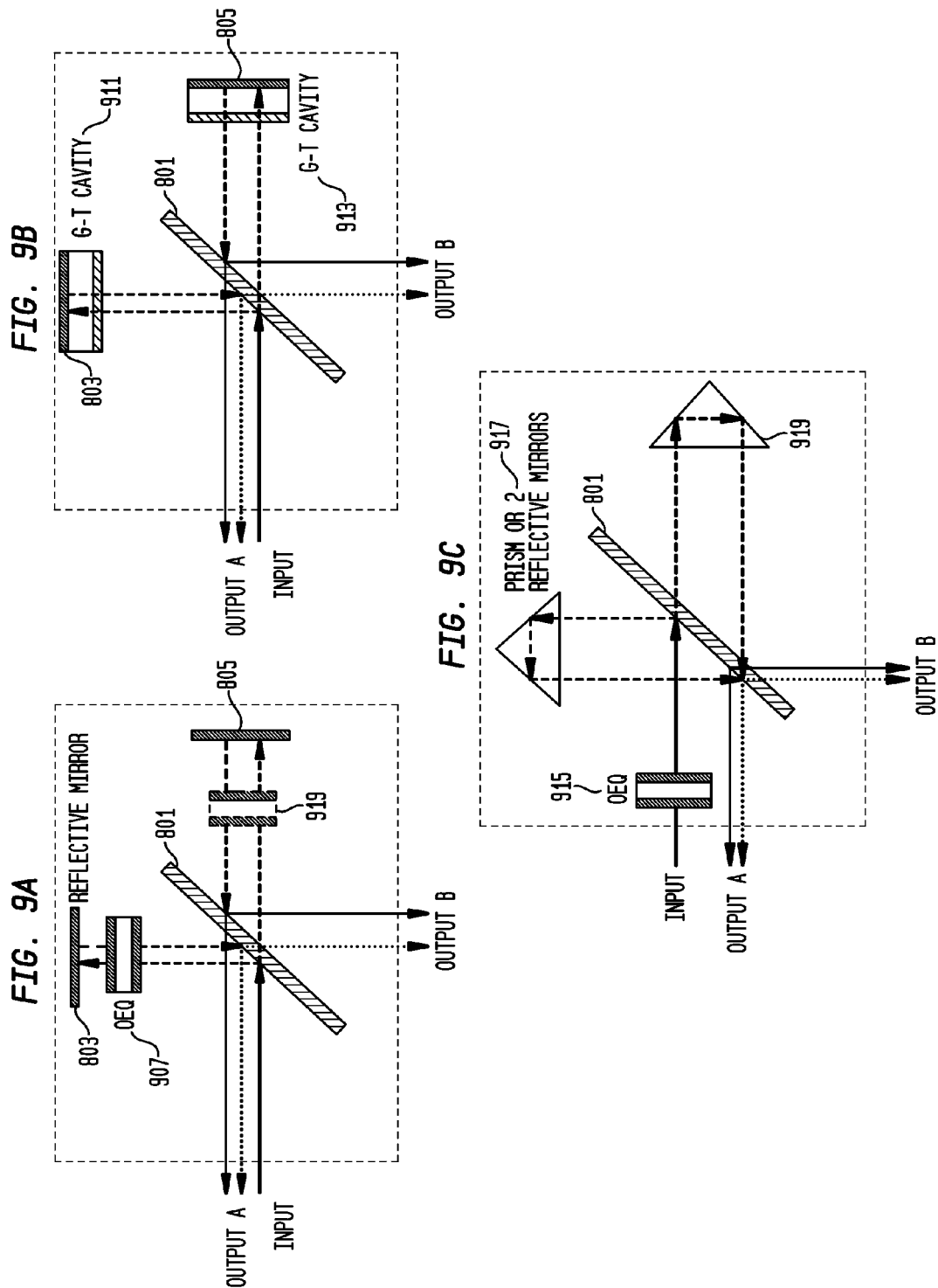

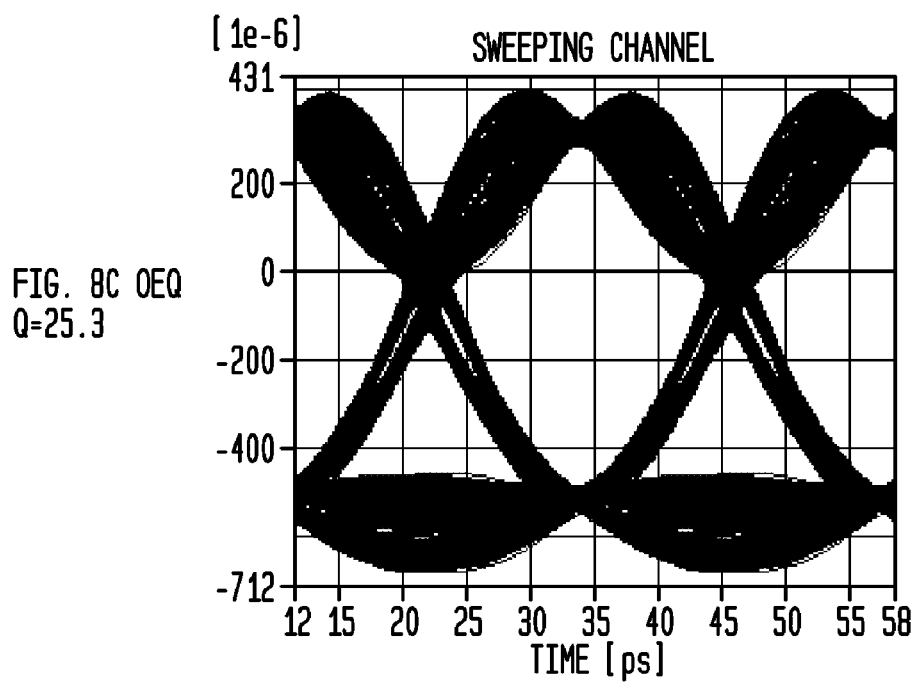
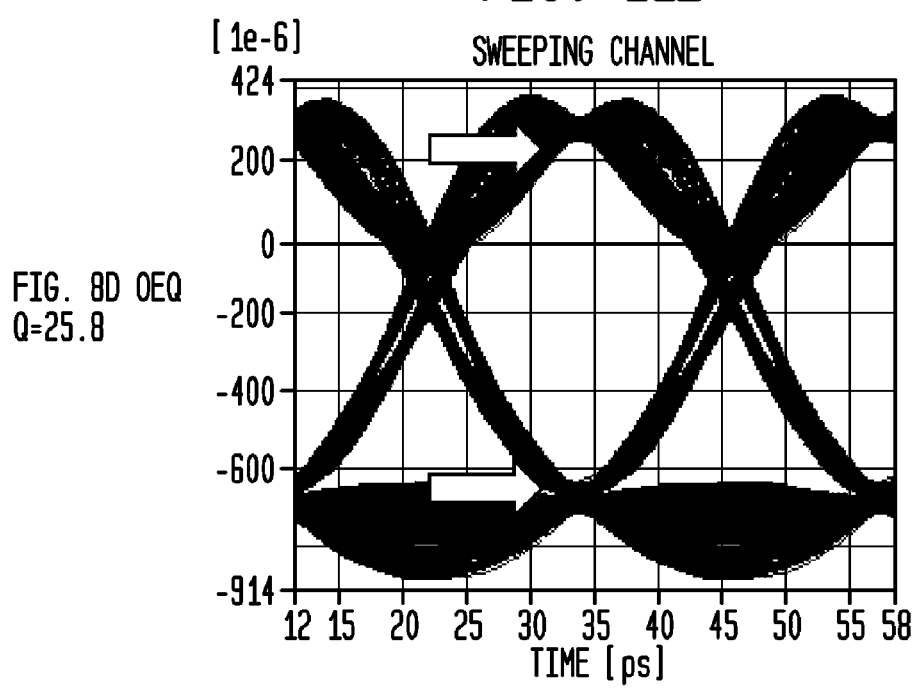

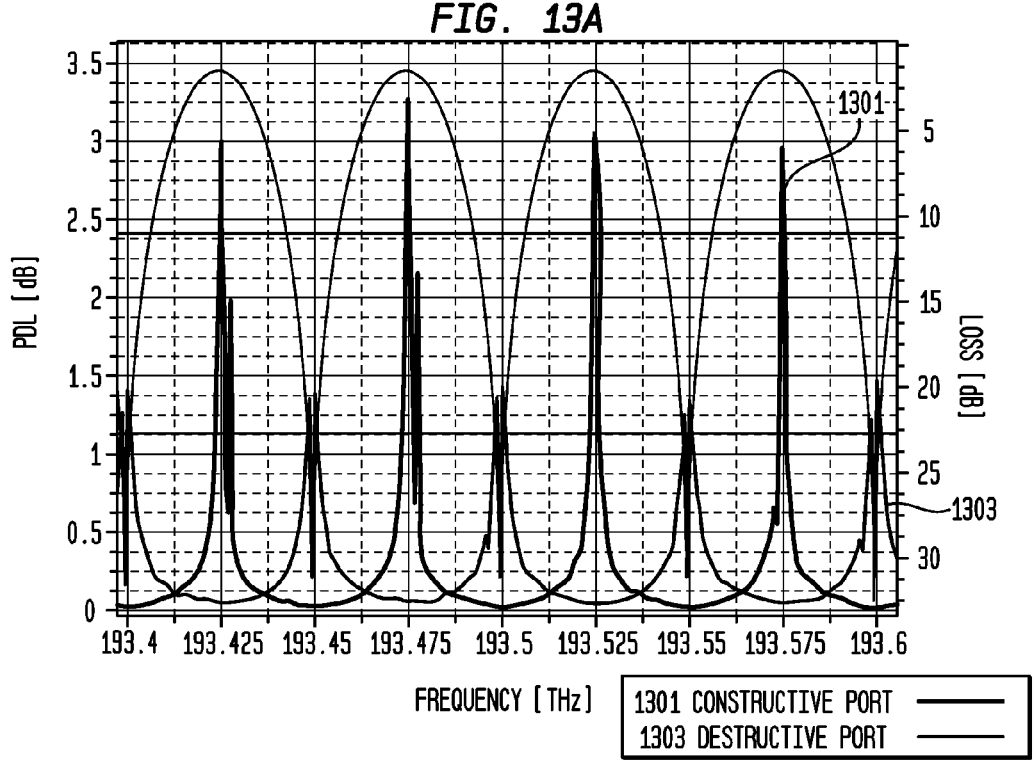
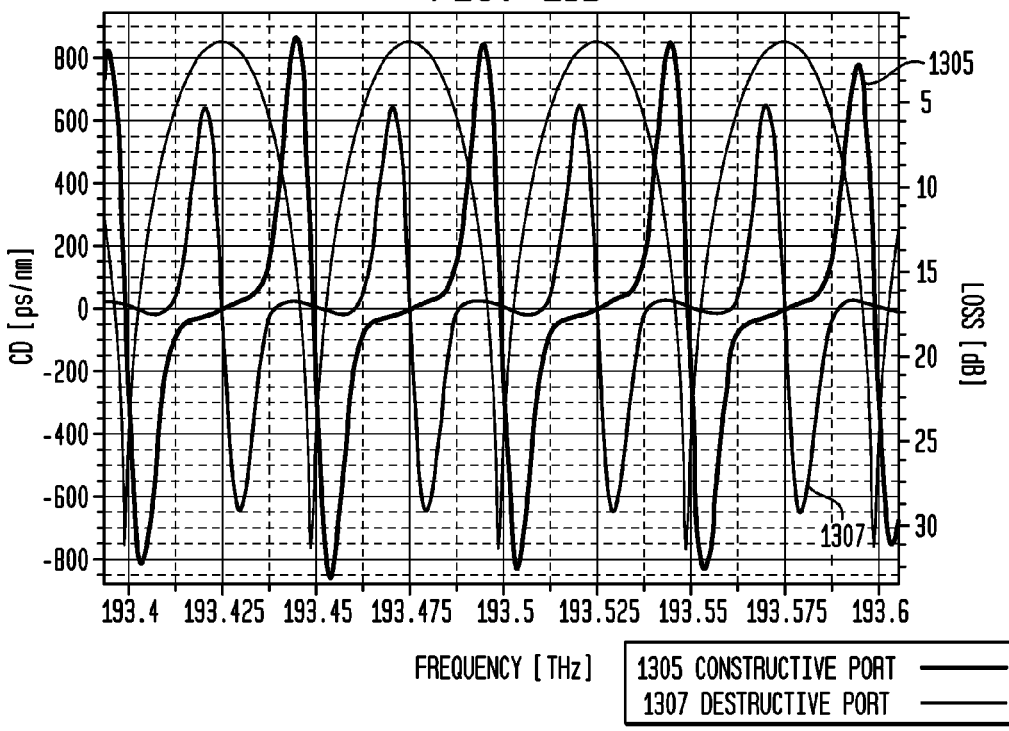

INTEGRATED EQUALIZER AND MICHELSON INTERFEROMETER STRUCTURE FOR INTER-SYMBOL INTERFERENCE-SUPPRESSED COLORLESS DPSK DEMODULATION

This application is a divisional of co-pending parent U.S. application Ser. No. 11/692,432, entitled "INTER-SYMBOL INTERFERENCE-SUPPORESSED COLORLESS DPSK DEMODULATION", filed on Mar. 28, 2007, which in turn is related to U.S. application Ser. No. 11/279,767, entitled "COLORLESS DIFFERENTIAL PHASE SHIFT KEYED AND LOW CROSSTALK DEMODULATORS", filed on Apr. 14, 2006, and U.S. application Ser. No. 11/619,499, entitled "OPTICAL EQUALIZATION FILTERING OF DWDM CHANNELS", filed on Jan. 3, 2007, both of which are incorporated by reference herein.

BACKGROUND OF THE INVENTION

The present invention relates generally to optical communications, and, more particularly, to a colorless differential phase shift keying demodulator for suppressing inter-symbol interference in dense wave division multiplexing communication systems.

Internet-based traffic has been growing exponentially due to the rapid increase of the microelectronic processing power, expansion of communication networks towards ubiquity, and emerging of modern bandwidth-thirsty business and personal applications such as video-on-demand (VoD) and storage area network (SAN). As the backbone to provide the transportation pipelines for such traffic volumes, the optical network has received demands for larger bandwidth capacity.

As a result, the 10 Gb/s bandwidth per channel in dense wavelength division multiplexing (DWDM) optical system is becoming inadequate. DWDM system with higher transmission rate of 40 Gb/s has begun to be deployed in long haul and metro optical networks.

In these new DWDM systems, the conventional on-off-keying (OOK)-based intensity modulation scheme, also called non-return-to-zero (NRZ), has very limited performance in long-haul optical transmission. New modulation formats such as differential phase-shift-keying (DPSK), differential quadrature phase-shift-keying (DQPSK) and duobinary have been developed to mitigate the fiber detrimental effects, achieve higher ONSR tolerance and/or deliver better spectral efficiency.

Among these new modulation formats, optical DPSK has become a popular candidate for 40 Gb/s DWDM transmission due to its tolerance to fiber nonlinearities and higher receiver sensitivity. It offers 3 dB OSNR improvement with a balanced receiver and a decrease of self-phase modulation (SPM) and cross-phase modulation (XPM) due to the constant envelope modulation. Although DPSK has superior transmission performance, its relatively broad spectrum limits the spectral efficiency of DPSK-based DWDM systems. Under 50 GHz ITU grids, 40G DPSK signal suffers from inter-symbol interference (ISI), where optical pulse width broadening due to narrow filtering leads to the interference between neighboring bits. The optical filtering effect in 50 GHz spaced systems leads to interference between neighboring signal bits. This phenomenon is known as the inter-symbol interference (ISI). The ISI effect can cause a dramatic increase in signal bit error rate.

FIG. 1 shows the schematic of a typical DWDM transmission system with 40 Gb/s DPSK signal on each DWDM channel. At the input side, each DWDM channel has a respective DPSK transmitter $101_1$ to $101_4$, which uses a differential encoder 1011 to apply one-bit-delay exclusive OR operation on the 40 Gb/s data, and modulates the phase of the continuous wave (CW) laser light 1012 at the phase modulator 1013. Each laser source has its respective DWDM wavelength on ITU-T grid. The output is an NRZ-DPSK signal. This signal is further intensity modulated 1015 with a driving clock 1014 signal to carve the pulse and reduce the phase chirp. So the final output of the transmitter is an RZ-DPSK or CSRZ (carrier-suppressed RZ)-DPSK signal. These 100 GHz spaced DPSK channels are combined using a 100 GHz AWG-based multiplexer $103_1$. Another set of multiplexer combined $103_2$, 100 GHz spaced DPSK channels (with 50 GHz center frequency offset to the first set) is combined with the first set using an optical 100 GHz to 50 GHz interleaver 107. After traveling through the optical link $115_1$, $115_2$ with intermediate repeaters $105_1$ to $105_3$, the DWDM signals are separated at the receiving node by 50 GHz to 100 GHz de-interleaver 109 and 100 GHz demultiplexers $111_1$ $111_2$. The demultiplexed individual channels are then sent to DPSK receiver $113_1$-$113_4$, which contains a delay interferometer (DI) 1131 and a pair of balanced detectors $1132_1$, $1132_2$. The DI uses the interference between the preceding bit and current bit to convert the phase modulated signal into an intensity modulated signal. The balanced detector can use the two output ports from the DI (the constructive port and destructive port) and improve the sensitivity of the receiver.

This schematic of FIG. 1 shows that each DWDM signal travels through several passive optical filter elements between the transmitter and the receiver. These elements include a multiplexer and demultiplexer, interleaver and de-interleaver. These optical elements cause a strong optical filtering effect to the 40 Gb/s DPSK signals, which broadens the 40 Gb/s optical signals and results in the extension of signal energy into the time slots of neighboring bits. The narrower the passband profile of these optical filter elements, the stronger the filtering effects on the 40 Gb/s signal. Other factors such as passband shape (flat-top or Gaussian), passband asymmetry, insertion loss ripple and center frequency offset will also affect the level of the filtering effect. There might be other filtering elements in the transmission link, such as wavelength blocker in optical add/drop multiplexer nodes. The eye diagrams of FIGS. 2A and 2B show the 33% RZ-DPSK signal at receiver before and after the 100 GHz AWG multiplexer and 100 GHz to 50 GHz interleaver. The ISI effect caused by these filtering elements is clearly demonstrated.

Proposed methods to mitigate ISI effect or to reduce the ISI problem caused by the strong filtering effect include use of spectral efficient modulation schemes; coding; side band pre-filtering methods; electronic equalization and optical equalization.

Use of spectral efficient modulation schemes such as optical duobinary and DQPSK modulation schemes can achieve 33 GHz at 90% spectral width. Therefore the signals are more tolerable to the filtering effect caused by the optical elements. However the duobinary signal has poor tolerance to nonlinear effect and therefore cannot has limited transmission span. The DQPSK modulation requires more complex and expensive transmitters and receivers.

An advanced coding scheme can be used to introduce correlation of the signal and control the power spectral density, and even lead to a reduction of signal spectral width. The downside is that the implementations are still technically challenging or very expensive for applications at a high speed such as 40 Gb/s.

Side band pre-filtering methods such as single-side-band (SSB) filtering and vestigial-side-band (VSB) filtering reduce the optical signal spectral width (to as much as half) to better fit into the passband width of the optical channel. The disadvantage is the increased complexity and compromised signal performance.

Electronic equalization such as electronic post-detection processing is used to improve system performance. The operation is typically based on feed-forward equalizers (FFE), decision feedback equalizers (DFE), maximum likelihood sequence estimation (MLSE), etc. It is shown that electronic equalization can partially cancel ISI and lead to an opening of the receiving signal eye. However, the performance of EDC is limited because the phase information of the incoming optical signals is lost due to OE conversion. Optical equalizers can be applied together with EDC.

An optical equalizer technology developed by applicants previously, an intra-channel optical equalizer, is a special optical filter. It is known that for a signal pulse not to have ISI it must satisfy the Nyquist criteria, and some popular Nyquist pulses have raised-cosine profile for their Fourier transforms. Therefore, it is desirable to set the transfer function of the band limited channel to a raised-cosine shape. Based on the given profiles of the passive optical filtering elements in the optical link, a corresponding optical equalizer is designed to complement them and produce an overall raised-cosine profile as shown in FIG. 3A for a multiplexer element, FIG. 3B for an interleaver element, FIG. 3C for combined filtering effect from multiplexer element and interleaver element, FIG. 3D for an optical equalizer element and FIG. 3E for an overall filtering effect with optical equalization.

The filter has a periodic profile with free spectral range (FSR) equal to the channel spacing of the DWDM signal and center frequency locked to the ITU-T channel grid, therefore it works on all the DWDM channels within the band.

Simulation results show about a 6 dB Q factor improvement for the back-to-back signals and 3 dB improvement after transmission over about 500 km fiber.

An optical equalizer with such a scheme can be designed based on Fabry-Perot (FP) interferometer theory and fabricated using dielectric thin-film technology. Comparison of ISI suppression without optical equalization, see eye diagrams 4A, 4B, and with optical equalization, see eye diagrams 4C, 4D, for a 40 Gb/s DPSK signal shows an improvement in the receiving signal particularly for the constructive port FIG. 4C.

A disadvantage of an optical equalizer is the requirement of an additional optical element in the transmission link. Also, as an athermal device without a temperature control mechanism, it might have temperature drift and have center frequency offset to the DPSK demodulator.

Accordingly, there is a need for an optical solution that integrates the functions of a DPSK demodulator and optical equalizer to reduce the inter-symbol interference ISI from the filtering effect on the optical path.

SUMMARY OF THE INVENTION

In accordance with the invention, an optical device includes an interferometer for a received optical differential phase shift keying DPSK signal, and an equalizer integrated with the interferometer in a manner for reducing from optical filtering effects interference by signal bits of the DPSK signal with signal bits of a contiguous DPSK signal. In an exemplary embodiment, the equalizer is integrated with the interferometer by optically placing a first of the equalizer 811 at an input and constructive path of the interferometer and a second of the equalizer 813 at a destructive path of the interferometer, the first and second of the equalizer having half of a filter ripple depth. The interferometer is a Michelson delay interferometer type, but can also be a Mach-Zehnder delay interferometer type on fiber, waveguide or other optical structure. The equalizer is a Fabry-Perot type equalizer, but can be a ring resonator type or a fiber based equalizer. Alternatively, a layer of glass in at least one optical path of the integrated interferometer or equalizer can be used for varying temperature of the glass to change the index of refraction of the glass, thereby varying an optical path through the glass.

In another aspect of the invention, a method includes the steps of providing constructive and destructive optical paths for a received optical differential phase shift keying DPSK signal, and integrating an equalizer with the providing for reducing from optical filtering effects an interference by signal bits of the DPSK signal with signal bits of a contiguous DPSK signal. In an exemplary embodiment, the integrating includes optically placing a first of the equalizer 811 at an input and the constructive path of the providing and optically placing a second of the equalizer 813 at the destructive path, the first and second of the equalizer having half of a filter ripple depth. The interferometer can be a Michelson Interferometer type and the equalizer can be a Fabry-Perot type equalizer. Alternatively, a layer of glass in at least one optical path of the integrated interferometer or equalizer can be used for varying temperature of the glass to change the index of refraction of the glass, thereby varying an optical path through the glass.

BRIEF DESCRIPTION OF DRAWINGS

These and other advantages of the invention will be apparent to those of ordinary skill in the art by reference to the following detailed description and the accompanying drawings.

FIGS. 2A and 2B are eye diagrams of ISI-induced signal degradation in 40 Gb/s 33% RZ-DPSK signal due to filtering effect.

FIG. 3 shows diagrams demonstrating an optical equalizing technique to compensate for the filtering effect from AWG and interleaver elements and generate a raised cosine profile.

FIGS. 4A and 4B are eye diagrams illustrating ISI suppression without an optical equalizer for a 40 Gb/s DPSK signal.

FIGS. 8A-8D are schematics of basic Michelson interferometer configurations for the inventive ISI-suppressed demodulator with integrated optical equalizing elements.

FIGS. 9A-9F are schematics of modified Michelson interferometer configurations for the inventive ISI-suppressed demodulator with integrated optical equalizing elements.

FIG. 11D is an eye diagram of a simulated Q factor of a received 40 Gb/s DPSK signal for an ISI suppressed DPSK demodulator implemented in accordance with FIG. 8C.

FIG. 11E is an eye diagram of a simulated Q factor of a received 40 Gb/s DPSK signal for an ISI suppressed DPSK demodulator implemented in accordance with FIG. 8D.

FIGS. 13A-C show polarization dependent loss, chromatic dispersion and differential group delay spectra of both outputs of ISI-suppresses DPSK demodulator.

DETAILED DESCRIPTION

Figure 5A:
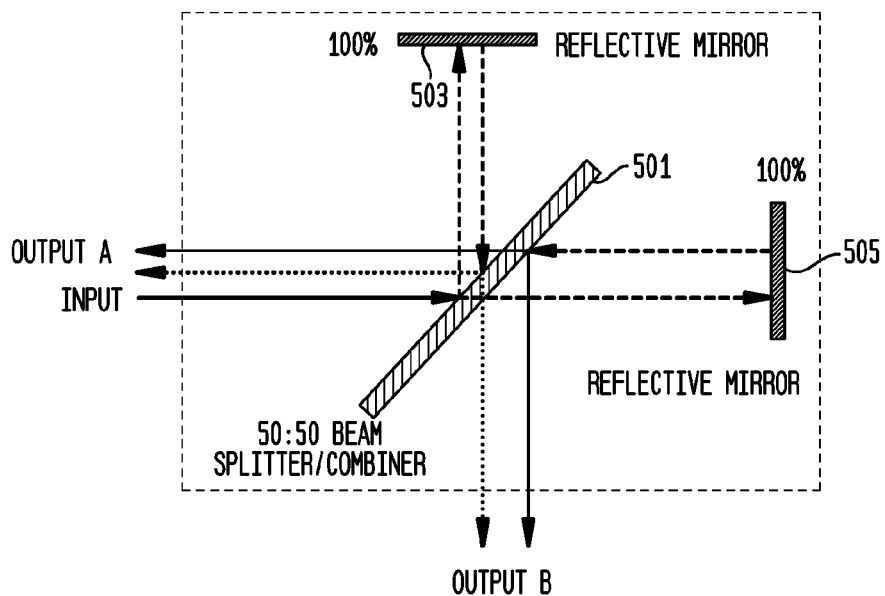
FIG. 5A is a schematic of a Michelson interferometer based DPSK demodulator.

The inventive inter-symbol interference ISI suppression integrates the functions of a DPSK demodulator and optical equalizer. It contains a delay interferometer to separate the constructive and destructive ports or paths of the received DPSK signal, and an intra-channel equalizer to mitigate the filtering effect from the optical path and thus suppress the ISI. The ISI-suppressed DPSK demodulator is a combination of a Michelson interferometer (MI)-based DPSK demodulator, see FIG. 5A, and a Fabry-Perot FP interferometer-based optical equalizer. Both of these optical elements have periodic spectral profiles that achieve colorless features.

Figure 5B:
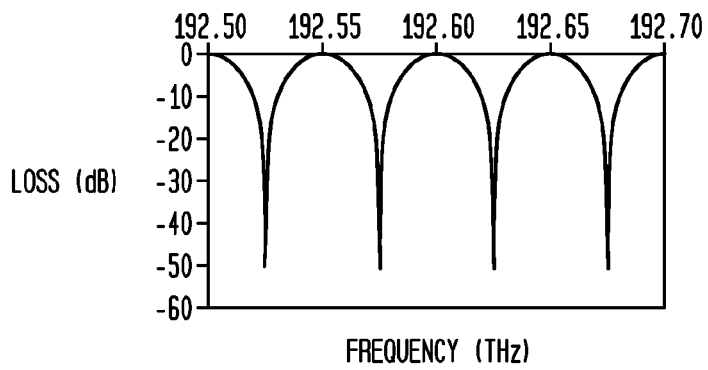
FIGS. 5B and 5C show the power spectrum and group delay (phase) spectrum of the DPSK demodulator of FIG. 5A.
Figure 5C:
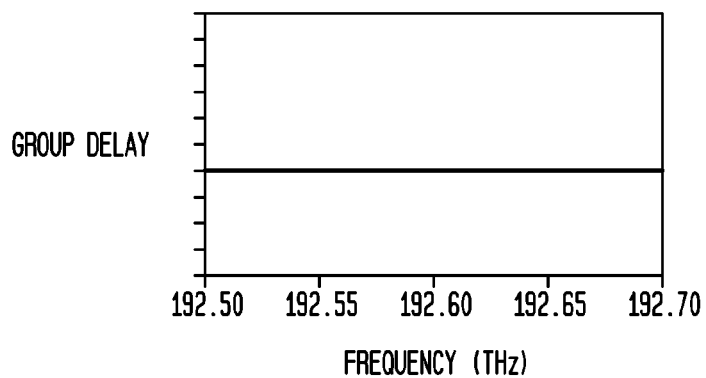

For the DPSK demodulator part, a free-space Michelson Interferometer MI structure is used. The input is through a beam splitter/combiner 501. The mirrors 503, 505 at both arms within the MI have reflectivity of 100% or close to 100%, and the optical path length difference between the two interfering arms is equal to the delay, which is 20 ps to achieve colorless operation at 50 GHz FSR system FIG. 5A. The power and phase (group delay) spectra of the DPSK demodulator can be expressed as:

$$\phi_L = \pi \frac{v}{v_c}$$

$$\text{Power} = \cos^2\left(\frac{\phi_L}{2}\right)$$

$$GD = \frac{1}{2\pi}\frac{d\phi_L}{dv}$$

where $v_c$ is the 50 GHz FSR. FIG. 5B shows the power spectrum, in log scale, having a periodic profile. FIG. 5C shows the group delay spectrum as a constant.

Figure 6A:
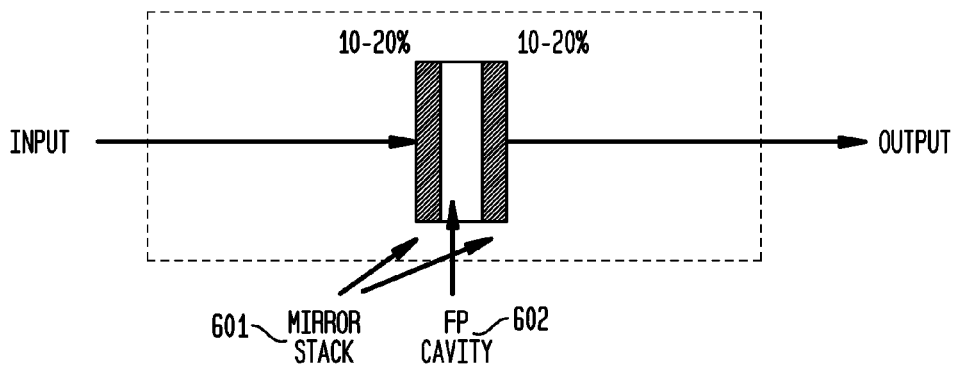
FIG. 6A is a schematic of a Fabry-Perot interferometer-based optical equalizer.

The FP interferometer (or FP etalon) consists of two partially reflective mirror surfaces 601 and a FP cavity 602, as shown in FIG. 6A. With dielectric thin-film technology, the mirror surfaces are constructed by stacking multiple layers of dielectric materials with alternating higher and lower refractive indices with carefully calculated thickness equaling to ¼ of the longest wavelength to be handled. The cavity between two mirror stacks is also constructed using different transparent material. The intensity function of a FP interferometer can be expressed as:

$$I_T = I_0 \times \frac{1}{1 + \frac{4F^2}{\pi^2}\sin^2\left(\frac{2\pi L}{\lambda \cos\theta}\right)} = I_0 \times \frac{1}{1 + \frac{4F^2}{\pi^2}\sin^2\left(\frac{2\pi n f L}{c \cos\theta}\right)}$$

$$\text{where } F = \text{Finesse} = \frac{FSR}{FWHM} = \frac{\pi\sqrt{R}}{1-R}$$

$$\text{and } I_0 = \frac{T^2}{(1-R)^2}$$

Figure 6B:
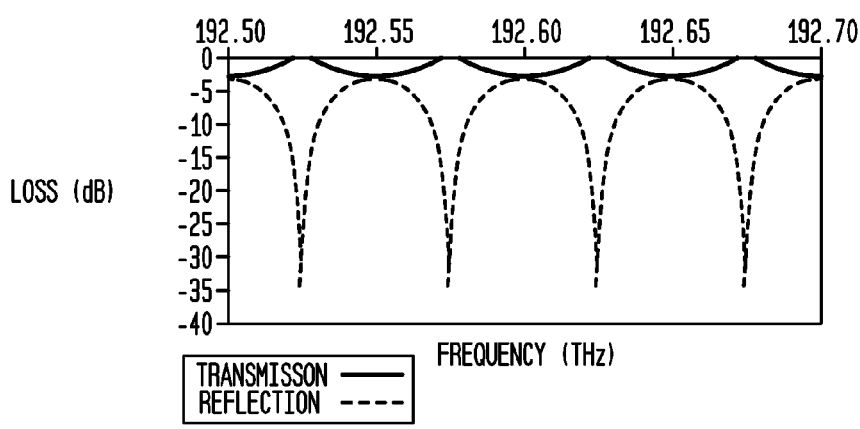
FIGS. 6B and 6C show the power spectrum and group delay (phase) spectrum of the DPSK demodulator of FIG. 5A.
Figure 6C:
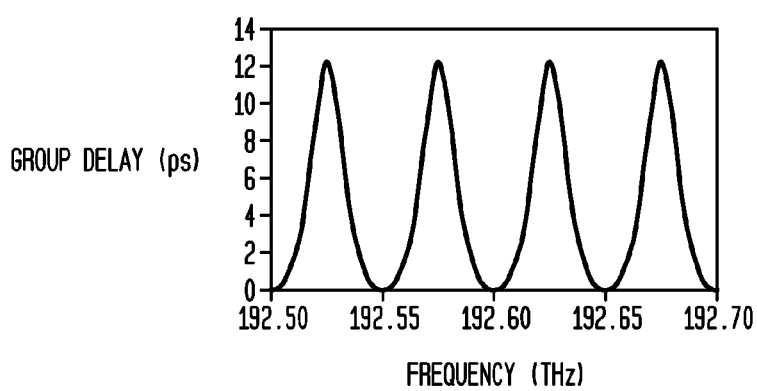

Here R is the reflectivity of the mirrors. For the optical equalizer application, the reflectivity value is between 10% and 20%. FIG. 6B shows the power spectra of both transmitted and reflected signal, and FIG. 6C shows the group delay spectrum. The transmission spectrum shows a ripple profile with a dip centered at each 50 GHz ITU-T grid. The depth of the dip is determined by the reflectivity of the mirror surfaces.

Figure 1:
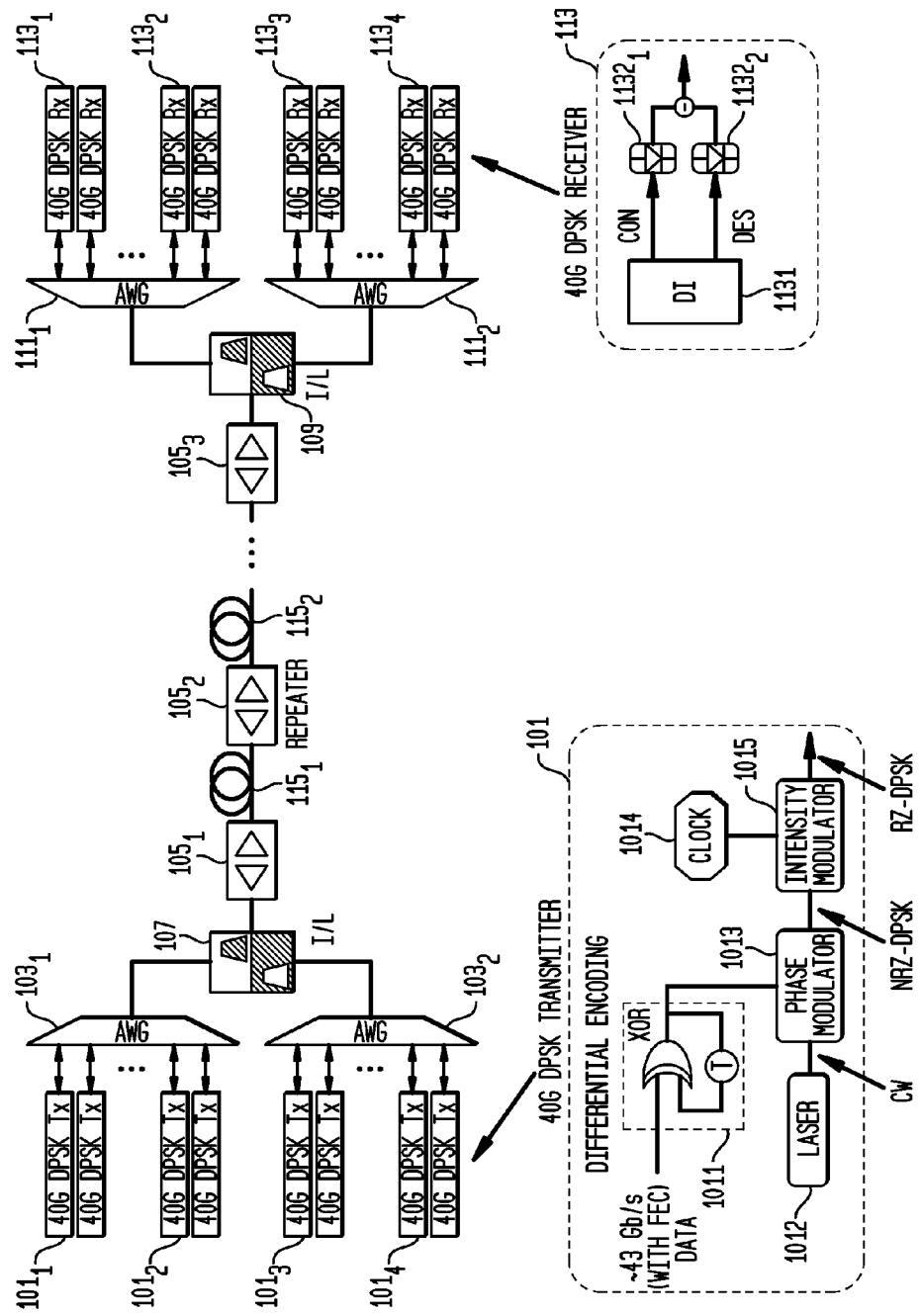
FIG. 1 is schematic of DWDM transmission link with 40 Gb/s DPSK-modulated signals.
Figure 7:
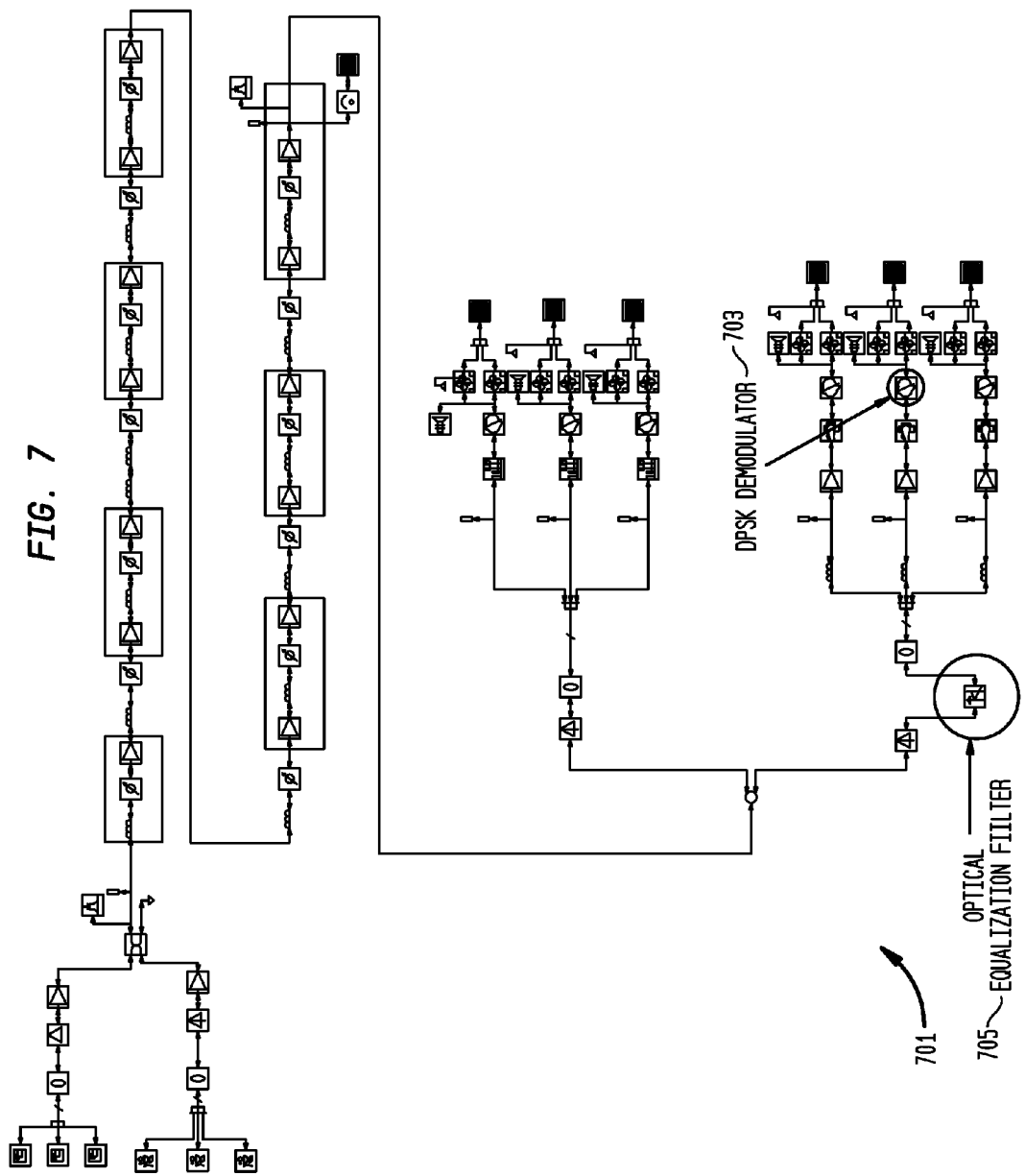
FIG. 7 is a schematic of an exemplary simulation network for verifying performance of the inventive ISI-suppressed DPSK demodulator.

FIG. 7 is a schematic 701 of a simulation network used to verify the optical performance of the inventive DPSK demodulator 703 with optical equalization 705. Six 50 GHz-spaced DWDM channels carrying 40 Gb/s DPSK signals are multiplexed through AWG multiplexer and interleaver elements as described in the network of FIG. 1. The received signal of the center channel is studied because it takes into account the crosstalk from neighboring channels at both sides.

The data of the optical devices used in the simulation (including the AWG multiplexer and demultiplexer, optical interleaver) are taken from measurement data of actual devices used in the field, which makes the simulation result closer to an actual value. Standard Mach-Zehnder interferometer (MZI)-based DPSK demodulator from a simulation software library is used. Its delay time is set to be 20 ps to reflect the colorless feature and it exhibits the same performance as an MI-based DPSK demodulator in simulations. For the FP equalizing filter, theoretical device data are used based on the model described for FIGS. 6A-6C. The depth of the dip at ITU-T grid center is set to be around 2.5 dB. This is an optimized figure based on the filtering elements in the optical path and the results of a previous study on optical equalizing technique.

In the simulation, the FP equalizing filter and the colorless DPSK demodulator are represented separately so that their relative positions in the integrated device can be varied, and the performance of different configurations can be compared. Also, the equalizer element can be singled out to compare the transmission performance with and without the inventive ISI suppression mechanism.

There are several possible configurations to integrate the colorless DPSK demodulator and the FP optical equalizer into the inventive ISI-suppressed DPSK demodulator. Each of them is described for their fabrication, feasibility and performance are compared. The configurations are grouped into three main types. The first type is the basic MI type, which uses standard MI-based DPSK demodulator with integrated optical equalizing elements outside its two interfering arms. The second type is the modified MI type, which modifies the MI structure to achieve certain features or benefits. The third type is non-MI type, which does not use MI structure for DPSK demodulation.

Configurations for the basic MI type, which uses a standard MI-based DPSK demodulator with integrated optical equalizing elements outside its two interfering arms, are shown in FIGS. 8A-8D. FIG. 8A is the most straight forward configuration. It adds the equalizing filter 807 before the DPSK demodulator 801, 803, 805. Even though the design is simple, it is difficult to implement. In an MI structure, the Output A and Input ports are very close to each other and share a dual fiber collimator. It is therefore difficult to apply the equalizer to just the Input port without affecting the Output A port.

In the second configuration shown in FIG. 8B, equalizing filters 807, 809 are placed at the output ports. It has a similar issue as the first configuration, FIG. 8A, because it requires placement of an equalizer 807 at one of the dual fiber output ports. Requiring two equalizing filters instead of one is a cost disadvantage.

The third configuration, shown in FIG. 8C, solves the dual collimator issue by placing the equalizer 811 over the paths of both Input and Output A. However the amount of equalizing and hence the ISI suppression is not equal between the Output A path and Output B path, because Output A path passes through the equalizer twice while Output B path only passes through it once. To compensate for this difference, another equalizer 813 is placed before the Output B. This configuration requires two equalizers also. Since the signals of both constructive and destructive ports (Outputs A and B) go through two stages of an equalizing filter, the depth of the equalizer ripple dips is halved to 1.25 dB each.

The fourth configuration of the invention, FIG. 8D is similar to the third configuration of FIG. 8C, but removes the equalizer at Output B port, namely, the destructive port. Even though this will cause an imbalance between the constructive and destructive paths as described above, there might not be much of a detriment to the signal quality because the effective portions of the equalizer (the dips) fall in the valleys (and not the peaks) of the destructive port.

In the Modified MI type structures, shown in FIGS. 9A-9F, changes are applied to the standard structure of an MI to solve some issues of the basic type device configurations discussed with FIGS. 8A-8D, such as the dual collimator issue. Since these modified type changes require special device designs, they cannot be directly constructed on existing DPSK demodulator hardware.

The first modified configuration, shown in FIG. 9A, places the equalizer 907 inside the MI structure to reduce the size of the overall device. This modification is difficult to design because with the equalizer in one path, the phase of the signal of the delay interferometer will no longer be linear, and the group delay will not be constant, which is a requirement of DPSK demodulator. It requires a complex design of an equalizer 909 in the other path to balance the nonlinear phase ripple. The additional optical component inside the MI structure also requires a modification of DPSK demodulator design The second modified configuration, FIG. 9B, is similar to the first modified configuration FIG. 9A, but instead of adding equalizing filters inside the MI-based DPSK demodulator, the equalizing filters are integrated with the reflective mirrors 803, 805 in the demodulator. This reduces the number of optical components inside the device. In this case, the mirrors are no longer 100% reflective, but have partial reflectivity and thus become Gires-Tournois cavities 911, 913. Despite the structural change, the design complexity is similar to the first modified configuration.

Figure 9D:
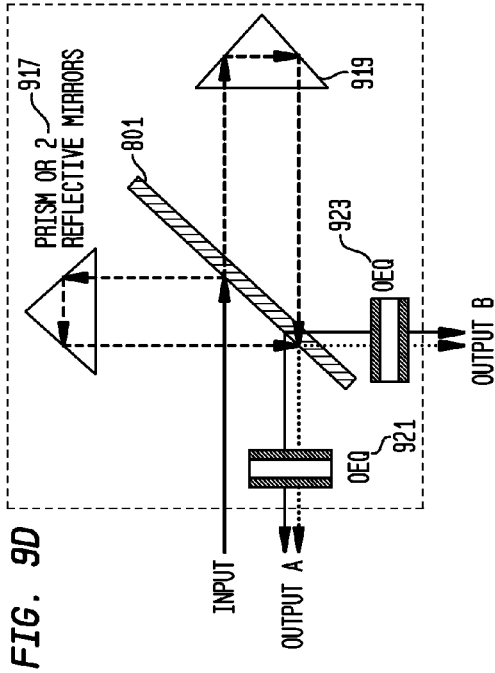

The third and fourth modified, configurations, see FIGS. 9C and 9D, use prisms or two reflective mirrors 917, 919 at each reflective end of the MI, enabling the reflected beam to have spatial offset from the incoming beam. Thus, the interference point will be moved away from the position where the input light is split. In this case, there will be a separation between the Input port and Output A port, thus a dual fiber collimator cannot be used. Despite the requirement of additional fiber collimator, the optical equalizer 915 can be placed at Input port without affecting Output A port, or the optical equalizer 921 can be placed at the Output port A 921 in tandem with an optical equalizer 923 placed in the path of Output port B.

Figure 9E:
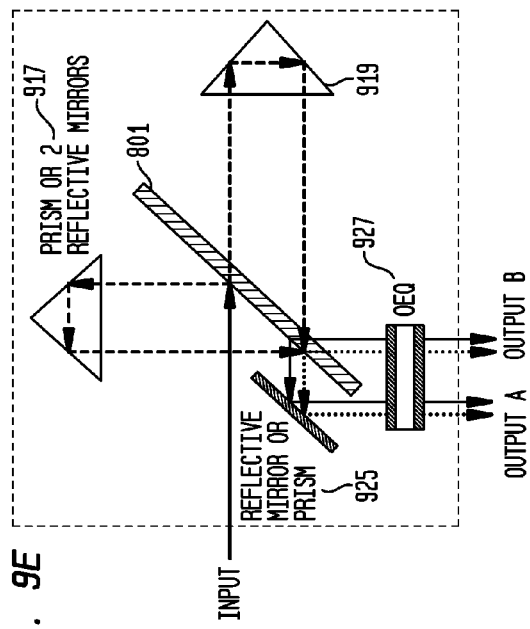

The fifth modified configuration, shown in FIG. 9E, has a structure similar to the third and fourth modified configurations of see FIGS. 9C and 9D, but it adds a reflective mirror or prism 925 at Output A port to deflect Output A beam to the same direction as Output B beam. Thus, the same optical equalizing element 927 can be shared between two output ports, provided that it is wide enough.

Figure 9F:
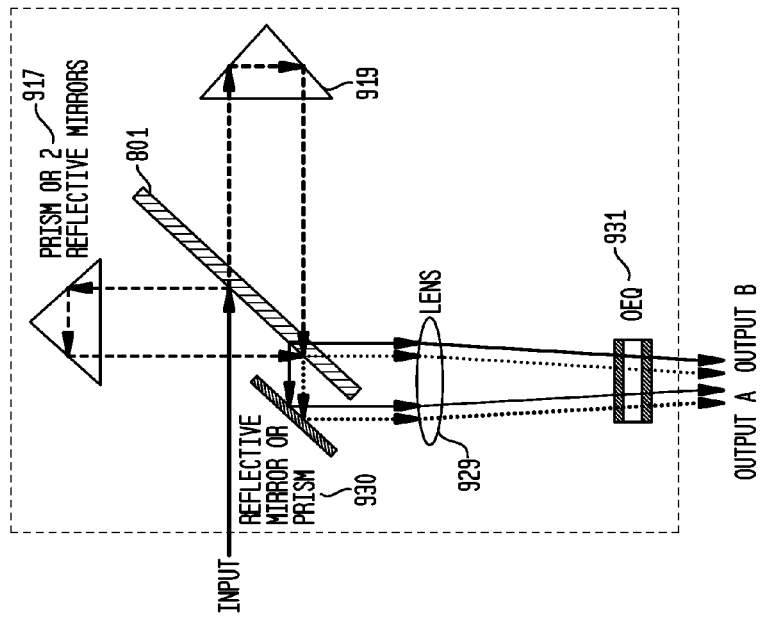

The configuration of FIG. 9E can be modified to produce a sixth modified configuration, shown in FIG. 9F, to insert an additional lens 929 at the output paths, so that the two output beams can share a dual fiber collimator. This is also very useful to integrate the balanced optical detector to the DPSK demodulator, because the balanced detector will usually have a close separation of about 250 μm between two photo detectors. This will also reduce the required width of the optical equalizing filter 931 inside the device.

Figure 10:
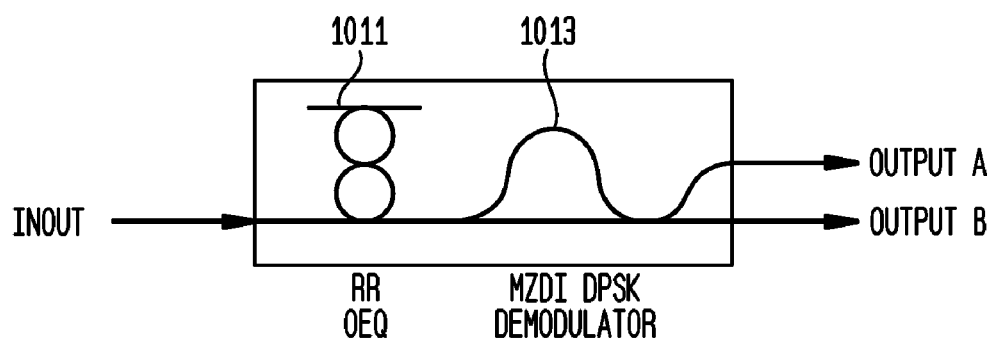
FIG. 10 is a schematic of a non-Michelson interferometer configuration for the inventive ISI-suppressed demodulator with integrated optical equalizing elements.

An exemplary non-Michelson Interferometer MI structure for practicing the inventive DPSK modulation is shown in FIG. 10. This inventive ISI suppression DPSK demodulator is constructed with an exemplary alternative to an MI structure, such as Mach-Zehnder delay interferometer (MZDI) 1013. There are corresponding technologies to integrate optical equalizing element inside these DPSK demodulators to achieve ISI suppressions. The embodiment of FIG. 10 uses a planar lightwave circuit (PLC) platform and integrates a ring resonator 1011 in front of the MZDI-based DPSK demodulator 1013. An equivalent optical fiber based structure can also be constructed similarly.

Diagrams showing the ISI suppression performance of embodiments of the invention are shown in FIGS. 11A-11E. In addition to considerations for the structural difference and feasibility of a particular embodiment's hardware fabrication, the ISI suppression performance is a key factor to select the best device design. Although ISI suppression performance for the basic inventive DPSK with optical equalization structures are diagramed, the other inventive DPSK structures will have similar performance behavior because the difference in the various embodiments of the invention is in the physical implementation and not the inventive device design of an integrated MI interferometer and optical equalization.

Figure 11A:
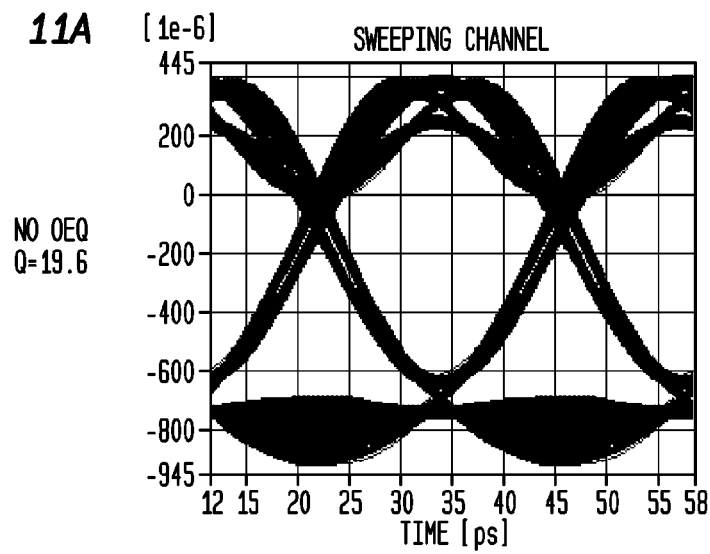
FIG. 11A is an eye diagram of a simulated Q factor of a received 40 Gb/s DPSK signal for an ISI suppressed DPSK demodulator without any FP equalizing filter in the optical path.

In a DPSK demodulator without any FP equalizing filter in the optical path, the simulated Q factor of the received 40 Gb/s DPSK signal is 19.6 dB, as shown by the simulated eye diagram of FIG. 11A. The simulated eye diagrams of FIGS. 11B-11E correspond to performance behavior for DPSK demodulator and equalization configurations of FIGS. 8A-8D, respectively. The Q factor values calculated from the eye diagrams are very similar, all within 25 to 26 dB. This represents around 5.5 dB improvement, which demonstrates the ISI suppression performance of the exemplary embodiments of the integrated interferometer and optical equalization.

Figure 11B:
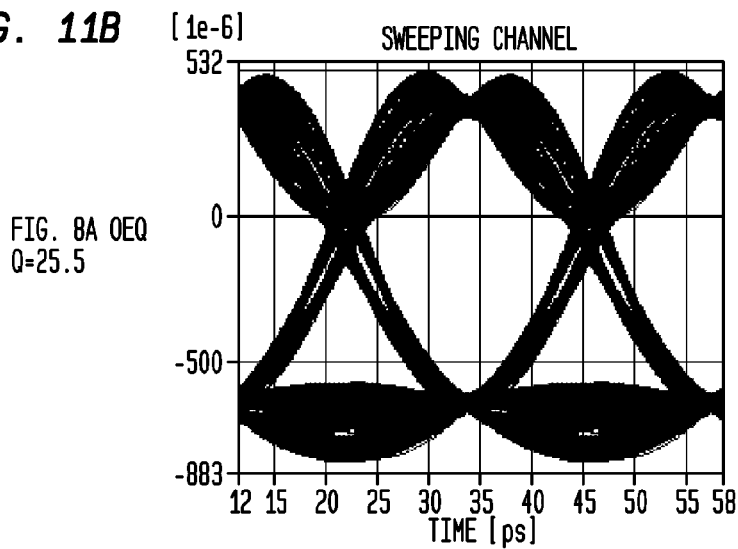
FIG. 11B is an eye diagram of a simulated Q factor of a received 40 Gb/s DPSK signal for an ISI suppressed DPSK demodulator implemented in accordance with FIG. 8A.
Figure 11C:
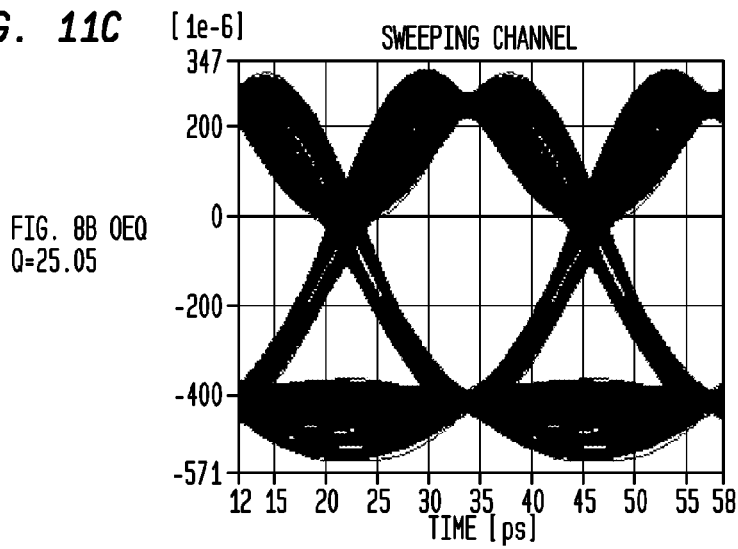
FIG. 11c is an eye diagram of a simulated Q factor of a received 40 Gb/s DPSK signal for an ISI suppressed DPSK demodulator implemented in accordance with FIG. 8B.

However, the eye diagram of FIG. 11E of the received signal from the device configuration of 8D exhibits the least favored balance between the peak and valley, as compared to eye diagrams of FIGS. 11B-11C. To maintain good receiving signal quality a stronger threshold optimization adjustment can be made.

An advantage of the device configuration according to FIG. 8B is from not having a dual collimator issue or receiving signal balance issue. It can be implemented easily based on the existing MI-based DPSK demodulator fabrication technology and thin-film FP interferometer fabrication technology, which are both very mature.

Turning now to the performance considerations of an ISI suppressed DPSK demodulator device. Based on the configuration of FIG. 8C, samples of a DPSK demodulator with optical equalizing filter for ISI suppression were constructed with free-space MI technology and dielectric thin-film technology. A combined equalizer dip of 2.5 dB at 50 GHz ITU-T grid is required. The device had 50 GHz FSR for colorless operation. It is athermal and does not require a temperature control, therefore, it is a completely passive device.

The optical performance of the ISI-suppressed DSPK demodulator sample was measured with an analyzer, consisting of a fast sweep laser source, an optical test head, three precision power meters, and a PC controller. The measurement was performed from 1520 nm to 1570 nm to over the entire C-band and beyond. Measurement step size was 5 pm. Averaging was taken to reduce the measurement noise, particularly the phase measurement which is very sensitive to environmental variation such as temperature and vibration.

Figure 12:
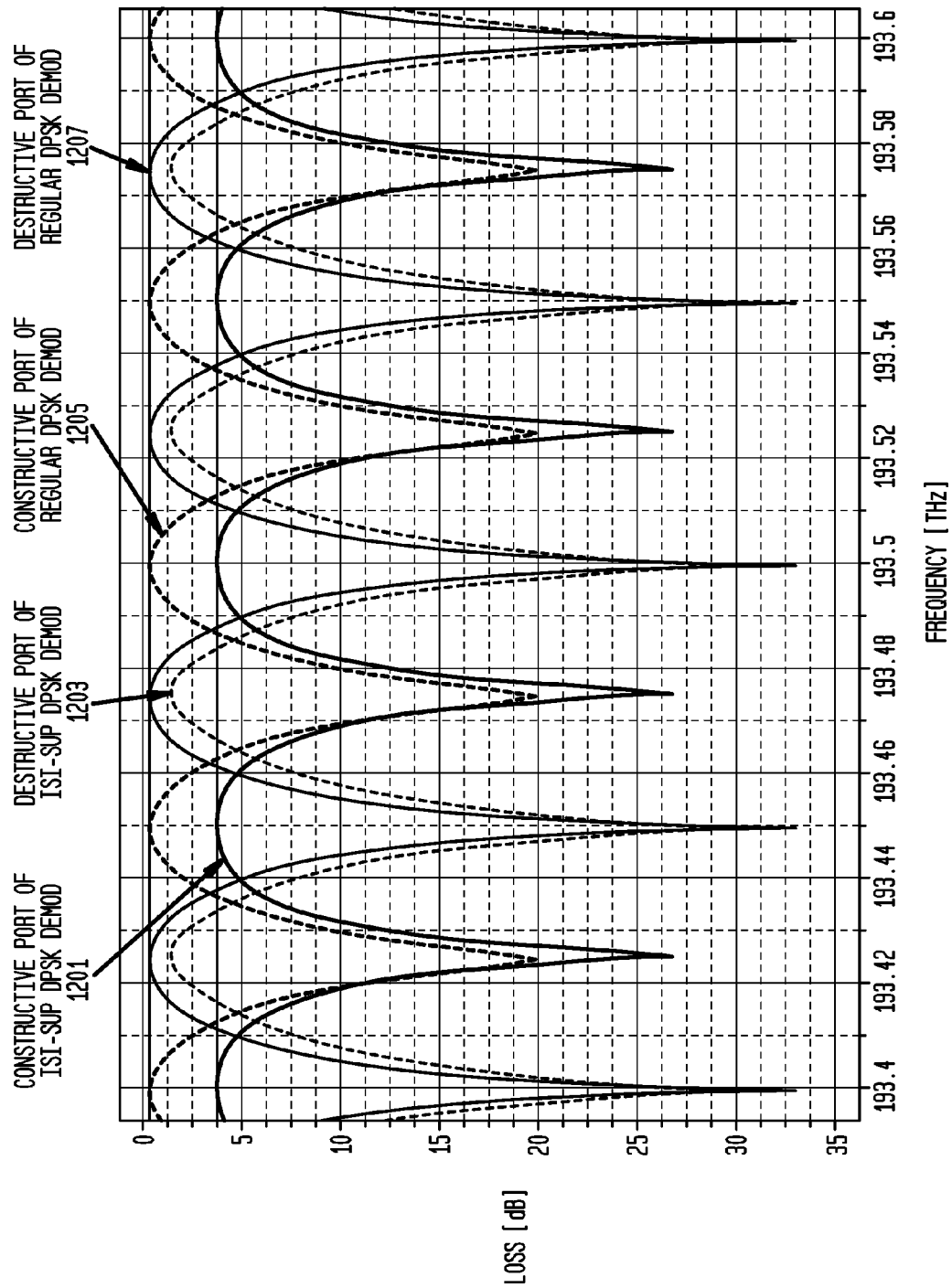
FIG. 12 depicts insertion loss spectrum of both outputs of ISI-suppressed DPSK demodulator compared to both outputs of a regular DPSK demodulator.

The plots of FIG. 12 show a selected portion of the insertion loss spectra of the two outputs of the DPSK demodulator with optical equalizing filter device based on the configuration of FIG. 8C, in comparison with a regular 50 GHz colorless DPSK demodulator. The red curve 1201 and green curve 1203 are the constructive port and destructive port outputs of the device configured according to FIG. 8C, respectively, while the blue and pink curves 1205, 1207 are constructive port and destructive port outputs for the regular DEPSK demodulator device without ISI suppression.

For the integrated ISI suppression DPSK demodulator, because the slopes of the DPSK demodulator element are sharper than the slopes of the equalizing filter element, the resultant passband of the constructive port does not show dips at the ITU-T grid center, but still has peaks. However, the effect of the equalizer dip is still obvious. Because unlike the regular demodulator whose two output ports have similar insertion loss peaks (about 0.45 dB), the constructive port and destructive port of the integrated device have different insertion loss peaks at around 3.75 dB and 1.45 dB respectively. The 2.3 dB difference is the result of additional equalizer dips. This figure is slightly smaller than the 2.5 dB from the design. The equalizer dip occurs at the valleys of the destructive port.

Compared to a regular colorless DPSK demodulator without ISI suppression, there is an extra 1 dB loss experienced by the inventive device embodiment of FIG. 8C at the destructive port where no equalizer dip is present. This is the insertion loss from the adding of the equalizer filter elements.

Figure 13C:
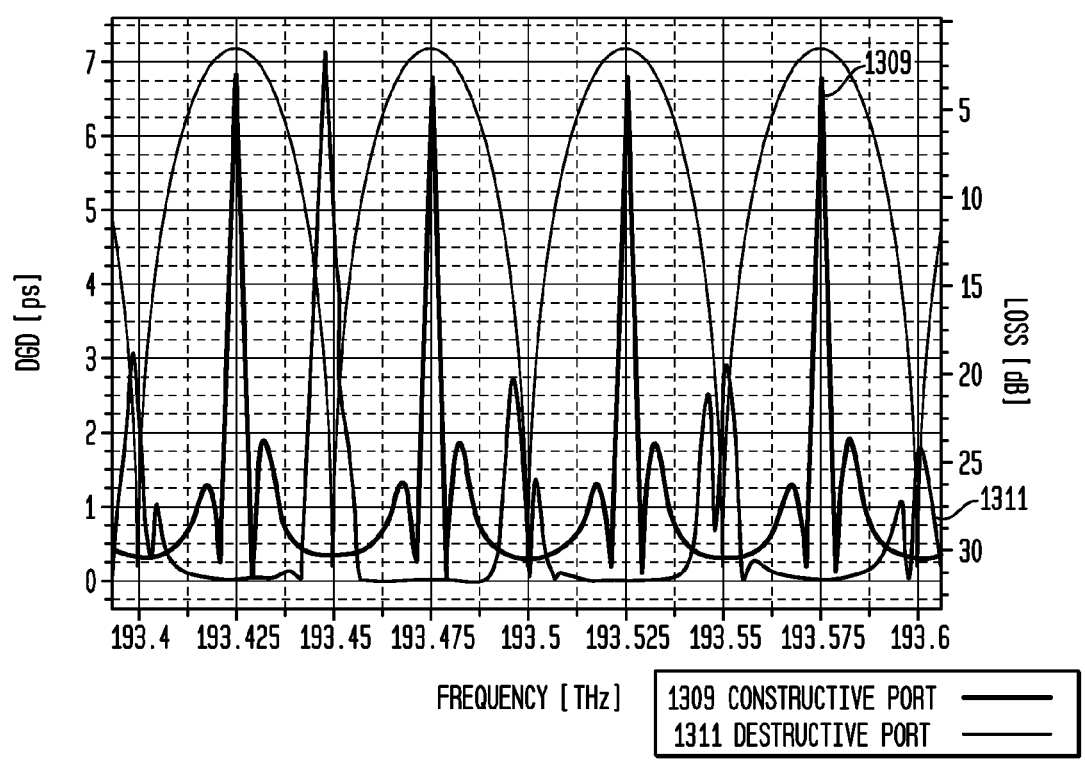

Referring now to FIGS. 13A to 13C, the curves shown are measurements of polarization dependent loss (PDL) FIG. 13A, chromatic dispersion (CD) FIG. 13B and differential group delay (DGD) 13C of both ports of the inventive device embodiment of FIG. 8C. The curves 1301, 1305 and 1309 are for the constructive port and curves 1303, 1307 and 1311 are for the destructive port of the device. The clear channel bandwidth defined for the analysis is ±12.5 GHz around the 25 GHz ITU-T grid center, giving a passband of 25 GHz.

The measured results show similar PDL behaviors between the two output ports, see FIG. 13A. The PDL values within the passband are about 0.14 dB maximum for both. This is within the 0.25 dB specified maximum value.

The trends of CD curves in the passband for both ports are different, see FIG. 13B. The constructive port has a negative CD slope within the passband with respect to frequency, while the destructive port has a positive CD slope around the center of each peak. The previous measurements on regular colorless DPSK demodulator showed opposite results, but with smaller slope values. The change of CD slope is caused by the CD of the thin film FP equalizing elements, which have negative CD slopes on ITU-T 50 GHz grids (which are the peak centers of the constructive port) and positive CD slopes on the 25 GHz offset positions (which are the peak centers of the destructive port). Within the 25 GHz clear channel passband, the CD value for the constructive port is about ±30 to 60 ps/nm, and for the destructive port is about ±100 to 130 ps/nm. The resolution bandwidth values selected for smoothing the group delay and CD are both 50 pm (10 measurement steps).

The behaviors of the differential group delay DGD profiles between the two output ports are also quite different, see FIG. 13C, the constructive port has a larger DGD value. The maximum DGD value within the 25 GHz clear channel passband is about 0.8 ps. The average of DGD within the 25 GHz passband is about 0.5 ps. This is sometimes defined as the polarization mode dispersion (PMD) value. For the destructive port, the DGD values smaller, with maximum of about 0.3 ps within the 25 GHz passband and average of less than 0.2 ps (PMD).

Figure 14:
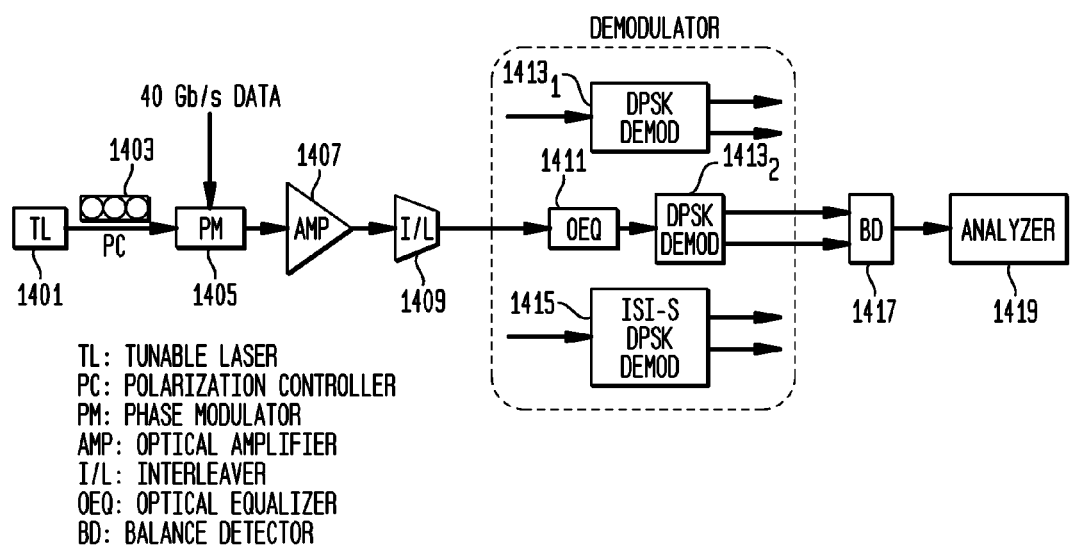
FIG. 14 is a schematic of a 40 Gb/s transmission experimental setup with different demodulation and equalization schemes for verifying the inventive integrated ISI-suppressed DPSK demodulator.

Turning now to the schematic of FIG. 14, a simple experimental transmission link for performing preliminary verification of the performance of the inventive integrated ISI-suppressed DPSK demodulator is shown. Data at a rate of 40 Gb/s is phase modulated 1405 onto a laser source 1401, 1403 centered on a ITU-T 50 GHz channel. The signal is amplified 1407 and transmitted through a 100 GHz to 50 GHz optical interleaver 1409. The interleaver imposes filtering effect onto the 40 Gb/s signal and causes ISI. The signal is then demodulated $1413_1$, $1413_2$ or 1415 at the output, and converted into electrical signal by a pair of balance detectors 1417. The received signal is displayed at a high-speed analyzer 1419. No fiber transmission is used in this experiment.

Three demodulation configurations $1413_1$, $1413_2$ or 1415 are tested and compared. The first demodulation configuration $1413_1$ is with a regular 50 GHz colorless DPSK demodulator only, the second demodulation configuration $1413_2$ is with separate optical equalizer and colorless DPSK demodulator devices, and the third configuration 1415 is with the inventive ISI-suppress colorless DPSK demodulator containing integrated equalizing.

Figure 4C:
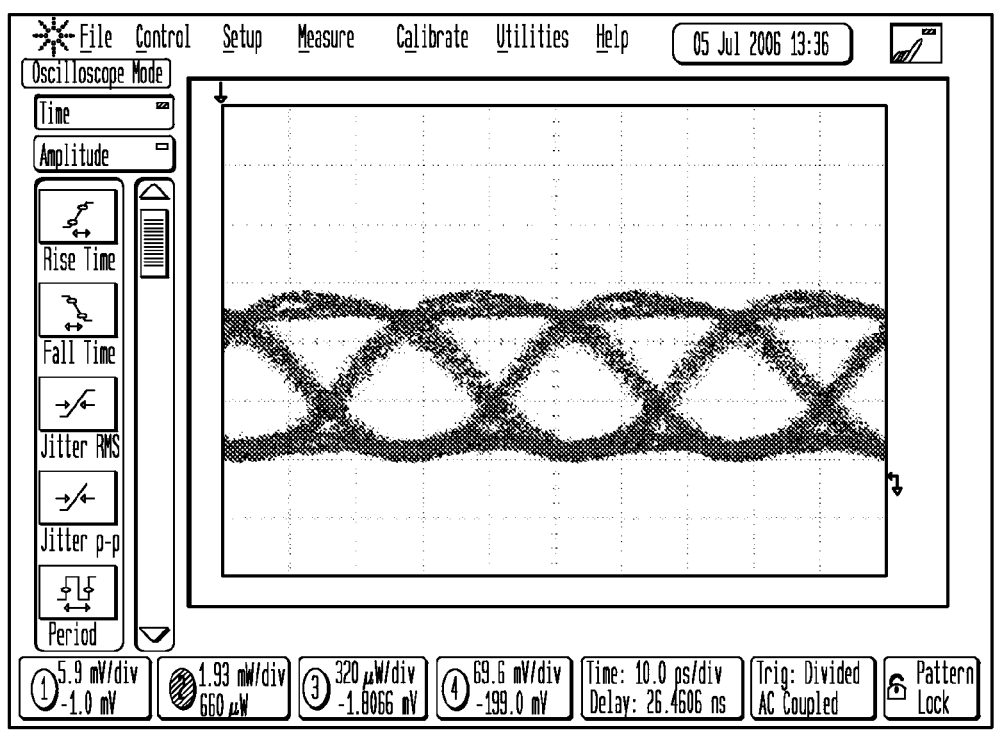
FIGS. 4c and 4D are eye diagrams illustrating ISI suppression with an optical equalizer for a 40 Gb/s DPSK signal.
Figure 4D:
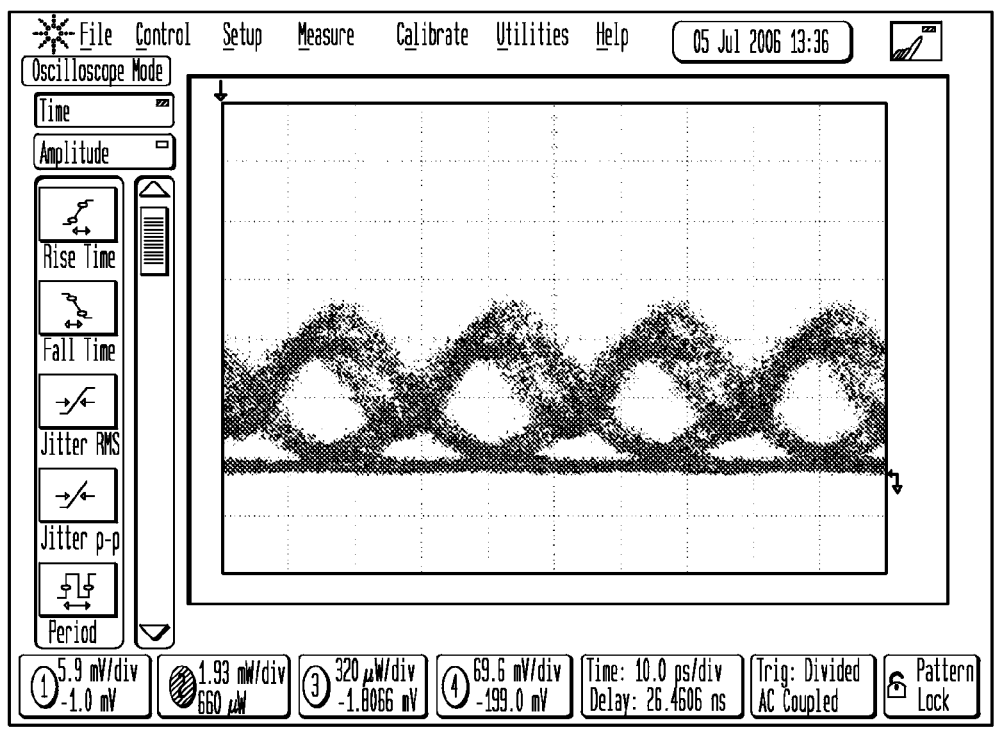
Figure 15A:
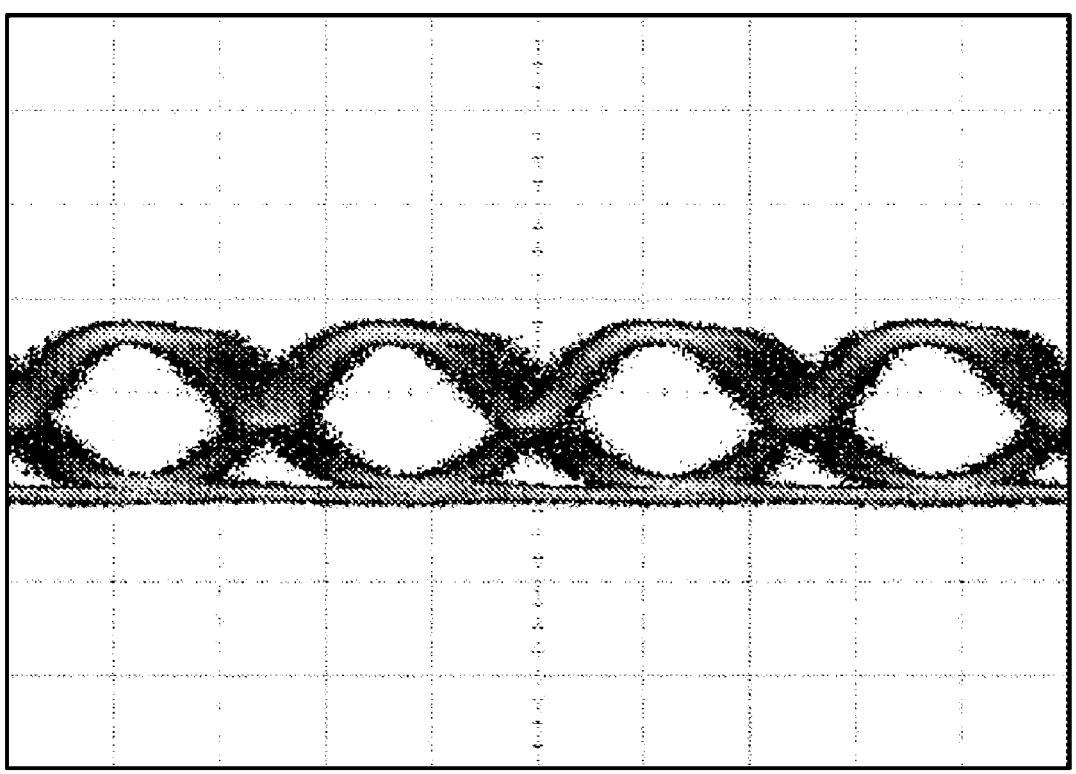
FIG. 15A is an eye diagram of a DPSK demodulated signal without any filtering effect, from the simulation setup according to FIG. 14.
Figure 15B:
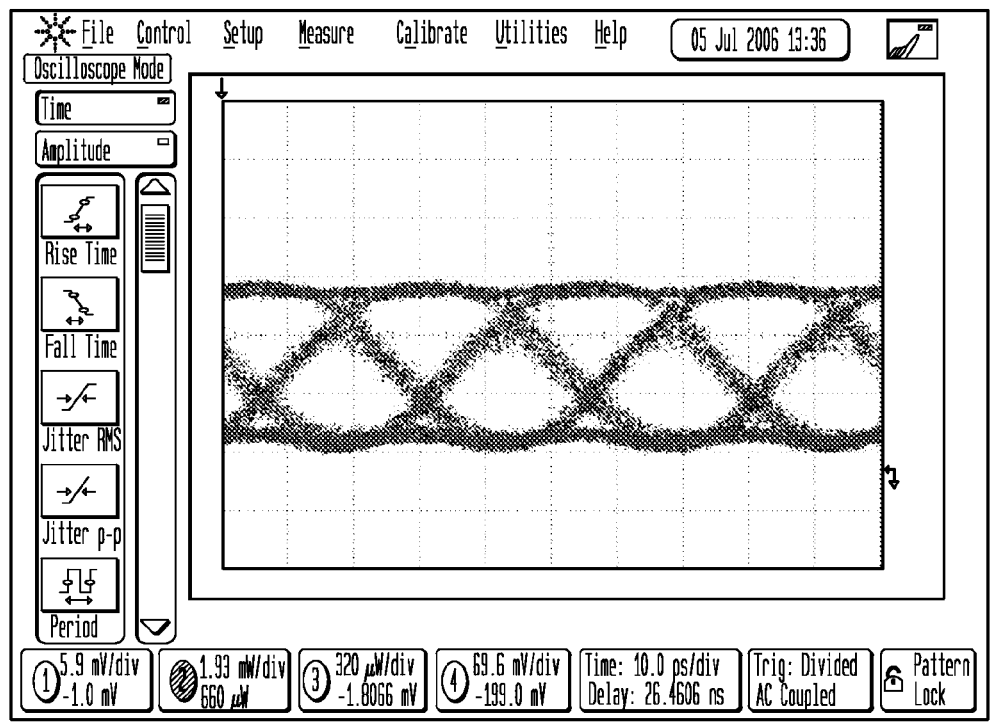
FIGS. 15B and 15C are eye diagrams for constructive and destructive ports of a DPSK demodulator without optical equalization, from the simulation setup according to FIG. 14.
Figure 15C:
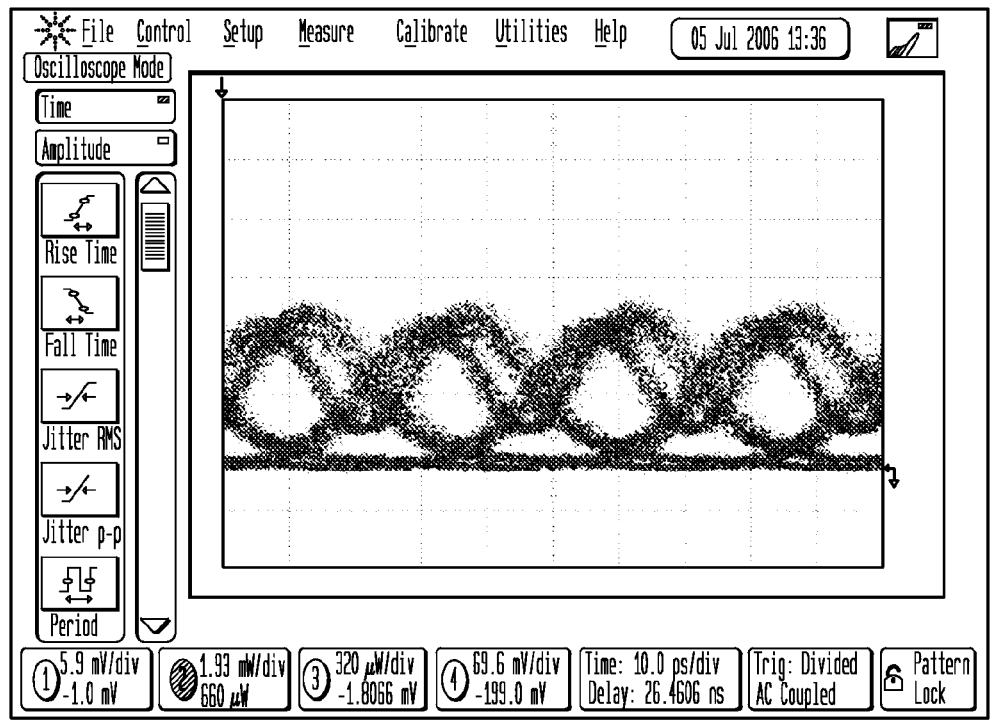
Figure 15D:
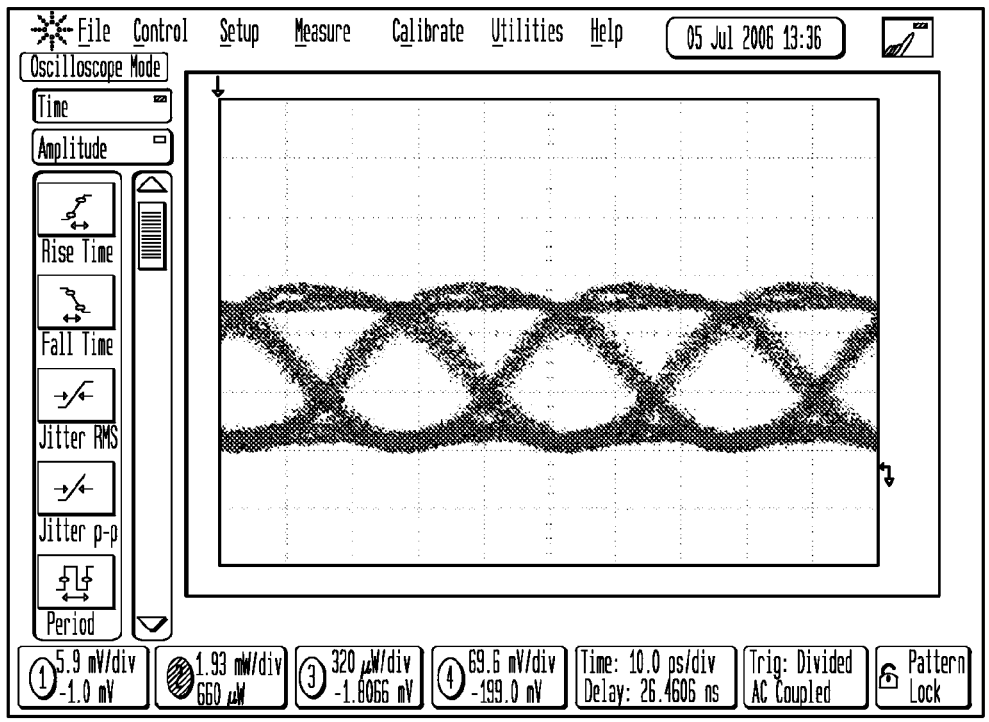
FIGS. 15D and 15E are eye diagrams for constructive and destructive ports of a DPSK demodulator with an external optical equalizer for ISI suppression, from the simulation setup according to FIG. 14.
Figure 15E:
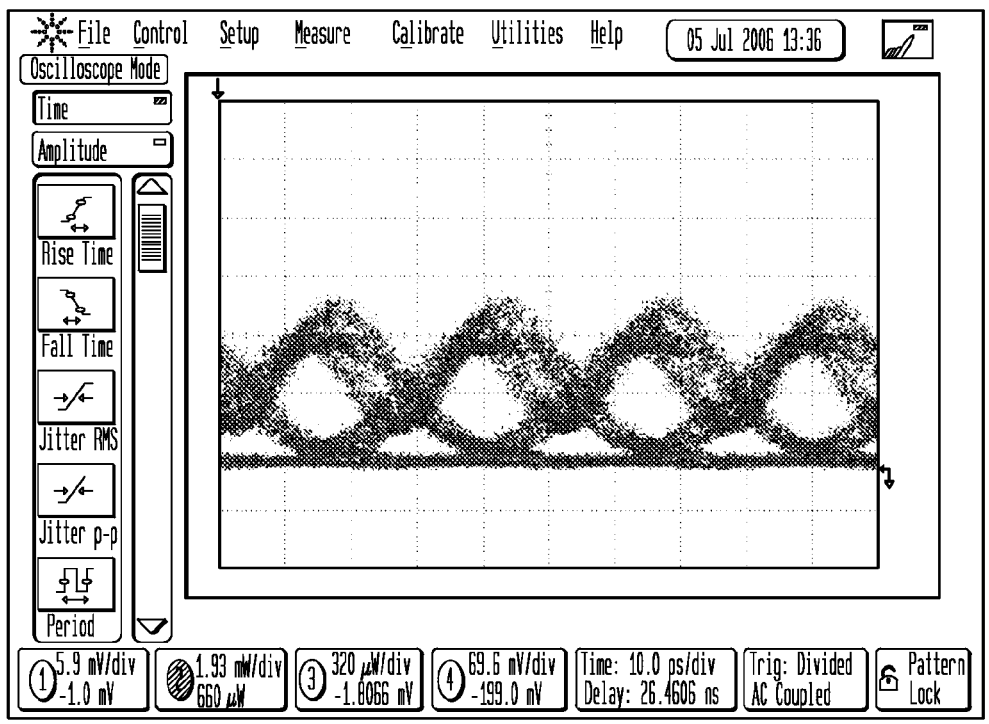
Figure 15F:
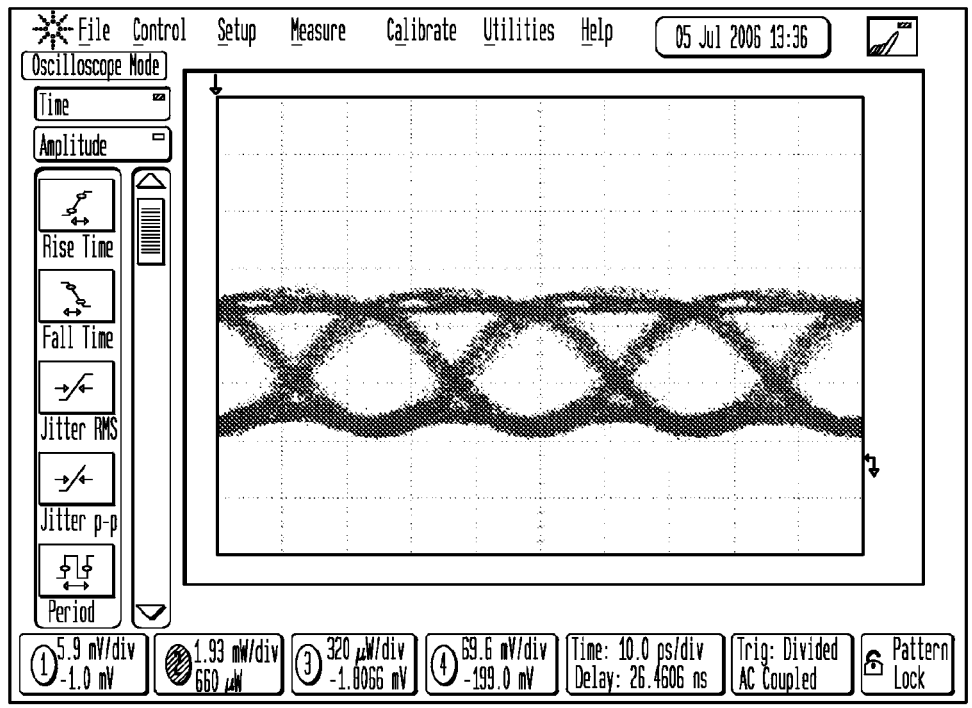
FIGS. 15F and 15G are eye diagrams for constructive and destructive ports of an integrated DPSK demodulator with an optical equalizer for ISI suppression, from the simulation setup according to FIG. 14.
Figure 15G:
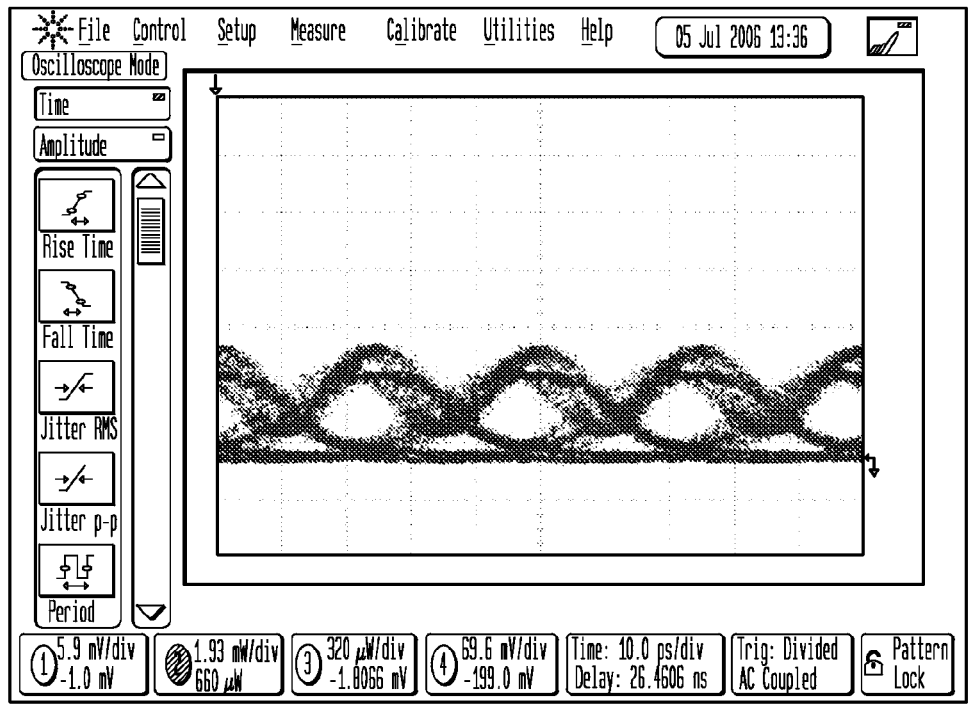

The receiving eye diagrams of these three demodulation configurations 1413$_1$, 1413$_2$ or 1415, both constructive and destructive ports, are shown in FIGS. 15B to 15G. The eye diagram of FIG. 15A is of a DPSK signal without any filtering. The eye diagrams of constructive port output 15B and destructive port output 15C are of a signal from a DPSK demodulator without optical equalization. The eye diagrams of constructive port output 15D and destructive port output 15E are of a signal from a DPSK demodulator with an external optical equalizer for ISI suppression. The eye diagrams of constructive port output 15F and destructive port output 15G are of a signal from an integrated DPSK demodulator with optical equalizer for ISI suppression. It is noted that the eye diagrams of FIG. 15B with 15C and FIG. 15D with 15E correspond to the eye diagrams FIG. 4A with 4B and 4C with 4D, respectively. The eye diagrams are compared to the DPSK eye diagram without any filtering effect from the interleaver, see FIG. 15A.

These eye diagrams clearly show that the corresponding two latter configurations 1413$_2$ or 1415, with optical equalization, produce better eye opening at the receiver compared to the DPSK demodulation without equalization. The improvement can be observed on both the constructive and destructive ports. The eye opening improvement between the external optical equalizer and integrated equalizer is small and cannot be judged by eye. However the destructive port output power level of the integrated device seems to be a bit lower. Similar results are obtained when the laser wavelength is tuned to other ITU-T channels. These results confirm that an ISI-suppressed colorless DPSK demodulator with an integrated optical equalizing element can reduce the ISI effect and improve the receiving signal quality after transmission.

The inventive DPSK modulator with optical equalizing provides features and advantages unavailable with current optical transmission techniques. The inventive ISI-suppressed DPSK demodulator device can mitigate the ISI caused by optical filtering effects during the transmission for 40 Gb/s DPSK signal. It has colorless operation which allows the same device to operate on any ITU-T 50 GHz DWDM channel, thus reducing the inventory requirement. It does the basic function of demodulating the DPSK signal.

Compared to prior separate optical equalizer technology, which has similar ISI suppression performance, the integrated DPSK demodulator has the following advantages: compact, eliminates additional fiber, smaller insertion loss, a greater tolerance to temperature variation and lower manufacturing cost.

Compact: The size of the integrated ISI-suppressed DPSK demodulator is only slightly larger than the regular DPSK demodulator. This is smaller than having two separate devices, and will reduce the footprint on the transponder line cards.

Eliminating additional fiber: With the integration, the equalizing and demodulation elements are placed together. Therefore the fiber between two devices is eliminated, so is the fusion splice or connectors and adapter in between. This will make the line cards more tidy and reduce fiber management task.

Smaller insertion loss: Even though it seems that the integrated device has larger insertion loss than regular DPSK demodulator (about 1 dB, based on the actual measurement), the overall insertion loss is actually smaller than the combined loss of separate optical equalizer and DPSK demodulator. Without considering the 2.5 dB dip, the spec insertion loss value of the separate optical equalizer and DPSK demodulator is 3.4 dB (1.2 for equalizer and 2.2 for demodulator), while for integrated device the spec value is 2.2 dB. This is because the integrated design eliminated a pair of fiber collimators that couple the light between free space and fiber inside the device, and the fiber collimators are the main contributor to insertion loss.

More tolerant to temperature variation: When the two elements, interferometer and equalizer, are integrated inside a small hermetically sealed package, they experience similar impact of environmental temperature change. Therefore, if there is a wavelength drift caused by the temperature change, these two components will more likely to have the same amount of drift (albeit small) and maintain good relative position. Separate equalizer and demodulator devices are likely to experience larger relative temperature-induced wavelength drift.

Lower manufacturing cost: Because of the elimination of components such as some fiber collimators and reducing the number of packaging from two to one, the manufacturing cost is reduced.

The inventive ISI-suppressed DPSK demodulator can be used in a 100 GHz spaced system. The inventive ISI-suppressed DPSK demodulator is designed for a 50 GHz-spaced system, and its equalizing element imposes dips on every 50 GHz ITU-T grid frequency. This is also optimized for a 100 GHz-spaced system where the 40 Gb/s signal experiences very different filtering effect (much less).

Figure 16A:
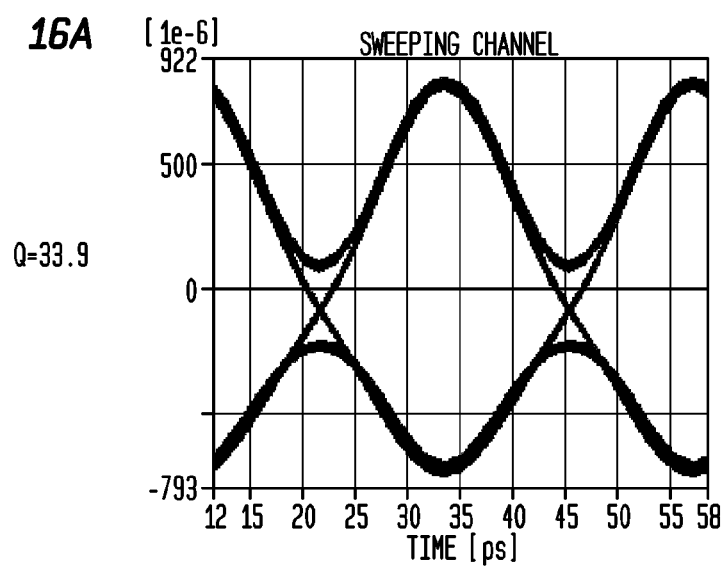
FIGS. 16A-16C are eye diagrams demonstrating the effect of optical equalization in a 100 GHz-spaced DWDM system with DPSK modulated signal, 16A is without optical equalization, 16B is with 2.5 dB dip optical equalizer at input and 16C is with 1.25 dB dip optical equalizers at both input and output.
Figure 16B:
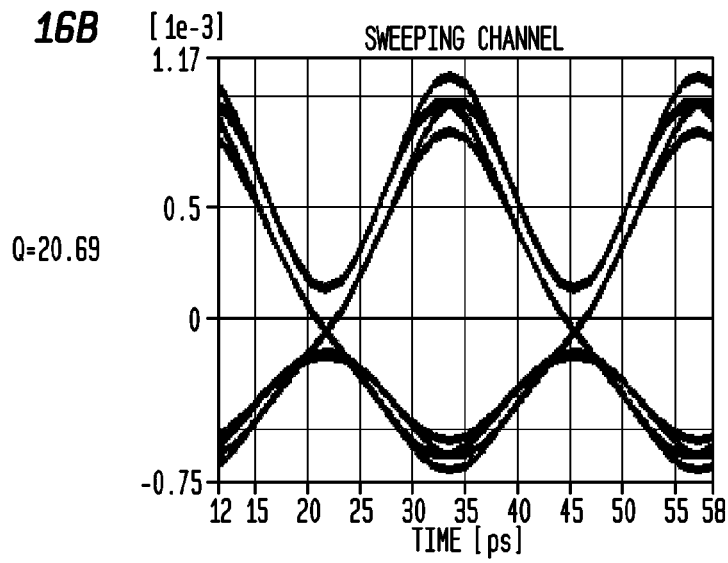
Figure 16C:
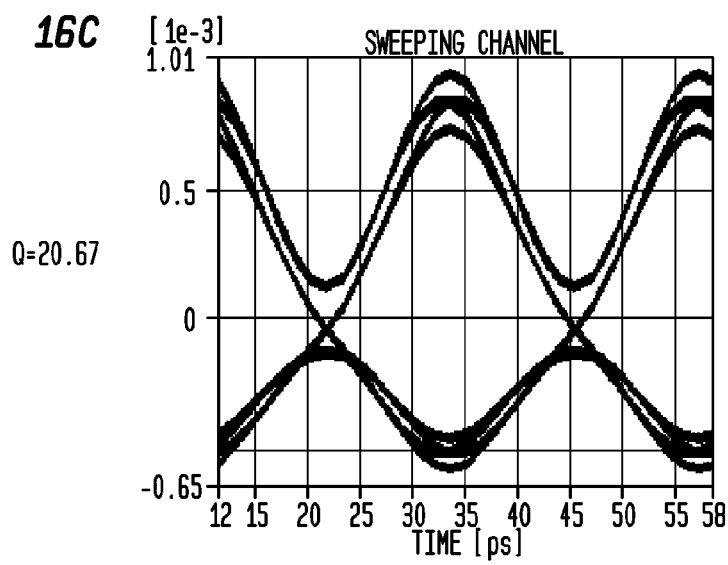

The eye diagrams of FIGS. 16A-16C are for the simulation results for a 100 GHz spaced system with three scenarios: without equalization FIG. 16A, with an external equalizer FIG. 16B, and with an integrated equalizer 16C. The results show around 13 dB worsening of the receiving signal Q factor with equalizer optimized for 50 GHz system (from 34 dB to 21 dB), regardless of external or internal equalizing. However even with the presence of a 50 GHz equalizer, the received signal quality is still good and has small inter-symbol interference ISI. Therefore, the negative effect of the 50 GHz equalizing element is small and the signal can be expected to satisfy the BER requirement within the system OSNR margin.

Even though the inventive device is athermal and can operate without any temperature control, it can experience slight frequency shift due to temperature. A tuning mechanism may be added to not only compensate for the frequency shift caused by temperature variation, but can also compensate for laser drift. Tuning can be added to the device by inserting a layer of special glass in the optical paths. This glass material would have a larger thermal coefficient. By varying its temperature, the refractive index of the glass material will change and lead to the variation of optical path length, allowing the spectrum of the DPSK demodulator to be tuned.

The inventive optical device, the ISI-suppressed DPSK demodulator, integrates an optical equalizer and colorless DPSK demodulator to mitigate the filtering effect-induced ISI for a 40 Gb/s DPSK signal in 50 GHz-spaced optical DWDM system. One exemplary embodiment of the invention includes two colorless FP-based optical equalizing filters with half of the filter ripple dip depth, one at the dual fiber port with Input and Output A, the other at the Output B port. The experimentally measured optical characteristics and ISI suppression performance demonstrate that the invention improves the transmission performance of a 40 Gb/s DPSK signal by reducing the ISI. Comparing to prior designs incorporating separate optical equalizer and demodulator devices, the inventive integrated device is more compact, has better optical performance, e.g., smaller insertion loss and better tolerance to temperature variation, and has lower cost. Therefore, the inventive integrated device is useful for improving transmission in DWDM networks.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. An optical device comprising:
   a first optical port for inputting a received optical differential phase shift keying (DPSK) signal, and for outputting a first equalized optical output signal;
   a second optical port for outputting a second equalized optical output signal;
   an interferometer for separating constructive and destructive paths of the received optical differential phase shift keying DPSK signal;
   a first equalizer located at the first optical port, and a second equalizer located at the second optical port;
   the first and second equalizers integrated with said interferometer for reducing from optical filtering effects an interference by signal bits of the DPSK signal with signal bits of a contiguous DPSK signal;
   said first and second equalizers being within said interferometer in the constructive and destructive optical paths of said interferometer;
   wherein no fiber, fusion splice, or connectors and adapters are needed between elements of the interferometer and equalizers, therefore enabling an overall insertion loss less than a combined loss of separate interferometer and equalizers;
   said interferometer and equalizers exhibit similar wavelength drift from temperature change thereby increasing more tolerance to temperature variation than separate interferometer and equalizers.

2. The optical device of claim 1, wherein said first and second equalizers are combined with respective reflecting mirrors in the constructive and destructive optical paths.

3. The optical device of claim 1, wherein said first and second equalizers are combined with respective reflecting mirrors in the constructive and destructive optical path and an optical beam splitter/combiner to form Gires-Tournois cavities.

4. A method of suppressing inter-symbol interference (ISI) in an optical device, comprising the steps of:
   providing constructive and destructive optical paths for a received optical differential phase shift keying (DPSK) signal in the form of an interferometer;
   providing a first equalizer at a first output port of the optical device, and a second equalizer at a second output port of the optical device;
   integrating the first and second equalizers with said interferometer for reducing from optical filtering effects an interference by signal bits of the DPSK signal with signal bits of a contiguous DPSK signal;
   said first and second equalizers being integrated within said interferometer in the constructive and destructive optical paths of said interferometer;
   eliminating the need of fiber, fusion splice, or connector between elements of the interferometer and the equalizers by said integrating step, therefore enabling an overall insertion loss less than a combined loss of separate interferometer and equalizers; and
   enabling said interferometer and equalizers to exhibit similar wavelength drift from temperature change by said integrating step, thereby increasing more tolerance to temperature variation than separate interferometer and equalizers.

5. The method of claim 4, further comprising a step of combining said first and second equalizers with respective reflecting mirrors in the constructive and destructive optical paths.

6. The method of claim 4, further comprising a step of combining said first and second equalizers with respective reflecting mirrors in the constructive and destructive optical path and an optical beam splitter/combiner to form Gires-Tournois cavities.

* * * * *